(12) United States Patent
Bennett et al.

(10) Patent No.: US 9,964,836 B2
(45) Date of Patent: *May 8, 2018

(54) AERIAL CAMERA SYSTEM

(75) Inventors: Patrick J. Bennett, Broken Arrow, OK (US); Garret Cook, Tulsa, OK (US); Matthew R. Jones, Garland, TX (US); Kaveh Ashenayi, Tulsa, OK (US); Michael F. Henry, Broken Arrow, OK (US); Alexander MacDonald, North Las Vegas, NV (US)

(73) Assignee: SKYCAM, LLC, Fort Worth, TX (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 13/472,089

(22) Filed: May 15, 2012

(65) Prior Publication Data

US 2012/0236148 A1 Sep. 20, 2012

Related U.S. Application Data

(63) Continuation of application No. 12/390,186, filed on Feb. 20, 2009, now Pat. No. 8,199,197.

(Continued)

(51) Int. Cl.
*G03B 15/00* (2006.01)
*F16M 11/10* (2006.01)
(Continued)

(52) U.S. Cl.
CPC ............ *G03B 15/006* (2013.01); *B66C 21/00* (2013.01); *B66D 1/38* (2013.01); *F16M 11/105* (2013.01);
(Continued)

(58) Field of Classification Search
CPC .... H04N 21/4223; H04N 7/181; H04N 7/183; H04N 7/18; H04N 7/005; H04N 3/08;
(Continued)

(56) References Cited

U.S. PATENT DOCUMENTS 2,156,862 A 5/1939 Best
3,308,966 A * 3/1967 Fawell .......................... 212/274
(Continued)

FOREIGN PATENT DOCUMENTS

JP 11314600 11/1999
WO WO2007030665 3/2007

*Primary Examiner* — Gevell Selby
(74) *Attorney, Agent, or Firm* — Schroeder Intellectual Property Law Group, LLC

(57) ABSTRACT

An aerial camera system including a plurality of main reels, a camera interface/safety reel and a stabilized camera head. The camera head is supported from main cables from the main reels with a safety reel cable providing power, data and video communication between the camera head and a main computer system. Each of the main reels, the camera interface/safety reel and the camera head are in communication with the main computer system, which controls the feeding and reeling in of the main cables. Further, the computer system controls the feeding and reeling in of the safety reel cable, which typically only follows the camera head as it moves in three-dimensional space, but may in emergency mode support the weight of the camera head and be used to slowly pull the camera head up and out of the way so that it does not interfere with any activity below the flight area.

21 Claims, 18 Drawing Sheets

Related U.S. Application Data

(60) Provisional application No. 61/030,081, filed on Feb. 20, 2008.

(51) Int. Cl.

| | | |
|---|---|---|
| *F16M 11/18* | (2006.01) | |
| *F16M 11/20* | (2006.01) | |
| *F16M 11/42* | (2006.01) | |
| *H04N 5/225* | (2006.01) | |
| *H04N 5/232* | (2006.01) | |
| *B66C 21/00* | (2006.01) | |
| *B66D 1/38* | (2006.01) | |

(52) U.S. Cl.
CPC ......... *F16M 11/18* (2013.01); *F16M 11/2064* (2013.01); *F16M 11/425* (2013.01); *H04N 5/2251* (2013.01); *H04N 5/232* (2013.01)

(58) Field of Classification Search
CPC ............... H04N 5/23203; H04N 5/232; H04N 5/23206; G01C 11/025; G03B 15/00; G03B 15/006; B66D 1/38; B66C 21/00; F16M 11/18; F16M 11/2064; G05B 19/25; G05B 19/19; G05B 19/42
USPC ........... 348/143, 144, 146, 207.11, 373, 376, 348/169, 157, 61; 73/1.77; 273/440, 273/402; 104/173.2, 112, 116, 117, 113; 340/323 R; 472/94; 352/243
See application file for complete search history.

(56) References Cited

U.S. PATENT DOCUMENTS

| | | | |
|---|---|---|---|
| 3,390,786 A * | 7/1968 | Gregori | 212/73 |
| 3,500,764 A * | 3/1970 | Warman | 104/114 |
| 3,866,858 A * | 2/1975 | Rattenberry | B64B 1/48 |
| | | | 116/67 R |
| 4,004,780 A * | 1/1977 | Kuzarov | 254/345 |
| 4,341,452 A | 7/1982 | Korling | |
| 4,386,680 A * | 6/1983 | Reed | 182/142 |
| 4,710,819 A | 12/1987 | Brown | |
| 5,752,088 A | 5/1998 | Desselle | |
| 5,906,358 A * | 5/1999 | Baziuk et al. | 254/266 |
| 6,566,834 B1 * | 5/2003 | Albus et al. | 318/568.2 |
| 6,698,722 B1 * | 3/2004 | Crawford | 254/284 |
| 6,873,355 B1 * | 3/2005 | Thompson et al. | 348/144 |
| 6,965,411 B1 | 11/2005 | Jones | |
| 7,753,642 B2 * | 7/2010 | Bosscher et al. | 414/735 |
| 8,199,197 B2 * | 6/2012 | Bennett et al. | 348/144 |
| 2006/0071116 A1 * | 4/2006 | Quenneville et al. | 242/557 |
| 2006/0231813 A1 * | 10/2006 | Welsh | 254/278 |
| 2007/0064208 A1 * | 3/2007 | Giegerich et al. | 353/122 |
| 2008/0121601 A1 * | 5/2008 | Ehrenleitner | 212/76 |
| 2008/0121602 A1 * | 5/2008 | Zhang | 212/278 |
| 2009/0127527 A1 * | 5/2009 | Hoffend, III | 254/338 |
| 2009/0301814 A1 * | 12/2009 | Rodnunsky | 182/141 |
| 2010/0279255 A1 * | 11/2010 | Williams, II | 434/29 |
| 2012/0211628 A1 * | 8/2012 | Fisher et al. | 248/329 |
| 2012/0298825 A1 * | 11/2012 | Fisher | 248/323 |
| 2013/0050652 A1 * | 2/2013 | Wharton | 352/34 |

* cited by examiner

AERIAL CAMERA SYSTEM

CROSS-REFERENCE TO RELATED APPLICATIONS

This application is a continuation patent application of and claims priority to U.S. patent application Ser. No. 12/390,186, filed Feb. 20, 2009, which claims the benefit of U.S. Provisional Application Ser. No. 61/030,081, filed Feb. 20, 2008, each of which is incorporated herein by reference in its entirety.

BACKGROUND OF THE INVENTION

1. Field of the Invention

This invention relates generally to an aerial camera system, and more particularly to an aerial camera system having a computer controlled, powered camera interface/safety reel and a stabilized camera platform for use in broadcast sporting events, film productions and entertainment events, such as concerts and awards shows.

2. Description of the Related Art

Known aerial camera systems encompass two main embodiments to move objects through three-dimensional space. One main type of known aerial camera system utilizes at least two supporting ropes in communication with a camera platform through a series of pulleys. The principal behind these types of aerial camera systems is a technique of relocating or displacing lengths of line in order to move an object in three-dimensional space, and specifically, an X-line controls the X-axis motion of the camera platform, while a Y-line controls the Y-axis motion of the camera platform, and relocating or displacing equal lengths of the X-line and Y-line allows the Z-axis of the camera platform to be traversed. In addition, by relocating or displacing equal lengths of the X and Y-line into the X-axis and Y-axis, the camera platform may be moved in X and Y space while maintaining a constant Z-axis position. Movement in each of the three-dimensions is substantially independent, with the X-line controlling X-axis motion and the Y-line controlling Y-axis motion of the camera platform.

Another main type of aerial camera system utilizes at least three flexible members and at least three motor driven reels for expanding and retracting the flexible members. The flexible members in this type of aerial camera system are attached to equipment support members and a camera mount.

Known aerial camera systems are typically impractical or difficult to use in that they fail to satisfactorily provide platform stability, ease of control, transportability, high speed, on-camera graphics, such as the first and ten line and other CGI graphics, and are prone to failure and disruption of the event being filmed. For example, during a New Orleans Saints versus Seattle Seahawks football game in October 2007, one of these aerial camera systems crashed to the playing field twice, almost hitting Seattle's quarterback, Matt Hasselbeck. "Officials delayed the game for almost 10 minutes before the network got the camera away from the field of play, parking it directly over the Seahawks' bench. Players stepped over themselves to avoid standing under it, as if it were a guillotine." ("Overhead, sideline cameras irk Holmgren in Seahawks' loss," Associated Press, 2007; http://sports.epsn.go.com/nfl/news/story?id=3068347).

It is therefore desirable to provide an aerial camera system with a transport system having a computer controlled, powered camera interface/safety reel.

It is further desirable to provide an aerial camera system having a camera head that includes a platform capable of various stabilization methods.

It is yet further desirable to provide an aerial camera system having a camera head capable of various camera movement methods.

It is still further desirable to provide an aerial camera system having a camera head that includes a camera lens with full servo control (drive and feedback) of the zoom, focus and iris settings, allowing for CGI graphics.

It is still further desirable to provide an aerial camera system having an extremely stabilized camera head that significantly improves video image stability using a combination of active stabilization of pan, tilt and roll motors and an actively stabilized platform.

It is still further desirable to provide an aerial camera system having a level wind assembly that keeps the cables wound on the drum of the main reels and/or the safety reel in a controlled and consistent manner.

It is yet further desirable to provide an aerial camera system having reflective surfaces on the main sheaves of in order to significantly increase the accuracy of determining the three-dimensional location of the main sheaves during setup.

SUMMARY OF THE INVENTION

In general, the invention relates to an aerial camera system having a plurality of main reels for feeding and reeling a plurality of main cables, a camera interface/safety reel for feeding and reeling a safety reel cable, a stabilized camera head being supported from and flown by the main cables, and a main computer system for controlling the feeding and reeling of the main cables and the safety reel cable. Each of the main reels, the camera interface/safety reel and the camera head are in communication with the main computer system, and the safety reel cable provides power, data and video communication between the camera head and the main computer system. Further, the safety reel cable is capable of supporting the weight of and reeling in the camera head in an emergency mode.

The camera head of the aerial camera system may include a plurality of cantilevered arms rotatably coupled to the main cables respectively. The cantilevered arms of the camera head may be fixed platform arms to adjust pull closer to the center of gravity, articulated platform arms to adjust the level of the camera head, or angled rods pivotally coupled intermediate of the camera head and a cable connection platform to adjust the level of the camera head.

In addition, the aerial camera system may include a camera mounted to the camera head, with the camera having three axis control with 45 degree angled roll axis before tilt axis or three axis control with orthogonal roll axis after tilt axis. The camera mounted to the camera head may provide for camera rotation about a lens nodal point in pan, tilt and roll axes, where the rotation about the lens nodal point eliminates parallax error. Furthermore, the camera mounted to the camera head may include a lens with full servo control of the lens zoom, focus and iris settings.

The camera interface/safety reel of the aerial camera system may have angled sheaves to eliminate cable twist. The camera interface/safety reel can also include a slip ring assembly to effectively transfer the power, data and video communication between the camera head and the main computer system. The aerial camera system can also include a level wind assembly to keep the safety reel cable wound on a drum of the camera interface/safety reel in a controlled and consistent manner. The level wind assembly may include a solid state tension sensor that accurately measures tension of the safety reel cable regardless of the angle from which the safety reel cable enters or exits the level wind assembly. Further, each of the main reels may include a level wind assembly coupled thereto in order to keep the main cable wound on the main reel in a controlled and consistent manner. Each of the level wind assemblies includes a solid state tension sensor that accurately measures tension of the main cable regardless of the angle from which the main cable enters or exits the level wind assembly.

The aerial camera system may further comprise a two axis gimbal assembly having two computer-controlled leveling motors for keeping the camera head level as the gimbal assembly moves. The camera head may further comprise two spinning mass gyroscopes mounted on the camera head such that the X-axis and the Y-axis each have one of the spinning mass gyroscopes. In addition, the camera head may have a solid state gyroscope for providing X-axis, Y-axis and Z-axis rotational angle information.

The camera head of the aerial camera system may also comprise an upper camera assembly having a weight plate, a gyro plate having the spinning mass gyroscopes mounted thereon, an electronics plate of the solid state gyroscope, a series of motor controllers and data converters mounted thereon, and a main platform having a pan motor and an array of power supplies mounted thereon. Additionally, the camera head may comprise a lower camera assembly having a pan support tube, a tilt support tube and a camera bracket assembly, wherein the pan support tube is rotatably coupled to the pan motor, wherein the pan support tube is pivotally coupled to the tilt support tube, and wherein tilt support tube is rotatably coupled to the camera bracket assembly.

The aerial camera system may have a plurality of main system sheaves in communication with the main cables and a center system sheave in communication with the safety reel cable. Further, each of the main system sheaves can have a reflective surface.

Each of the main reels and the camera interface/safety reel of the aerial camera system may be constructed of a portable frame supported on a plurality of casters; a motor secured to the frame, the motor having a drive shaft coupled to a drive sprocket, a drive belt coupled to the drive sprocket and a main sprocket; and a drum having a central axle, the central axle coupled to the main sprocket, and the central axle coupled to a brake.

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope. While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

Figure 1:
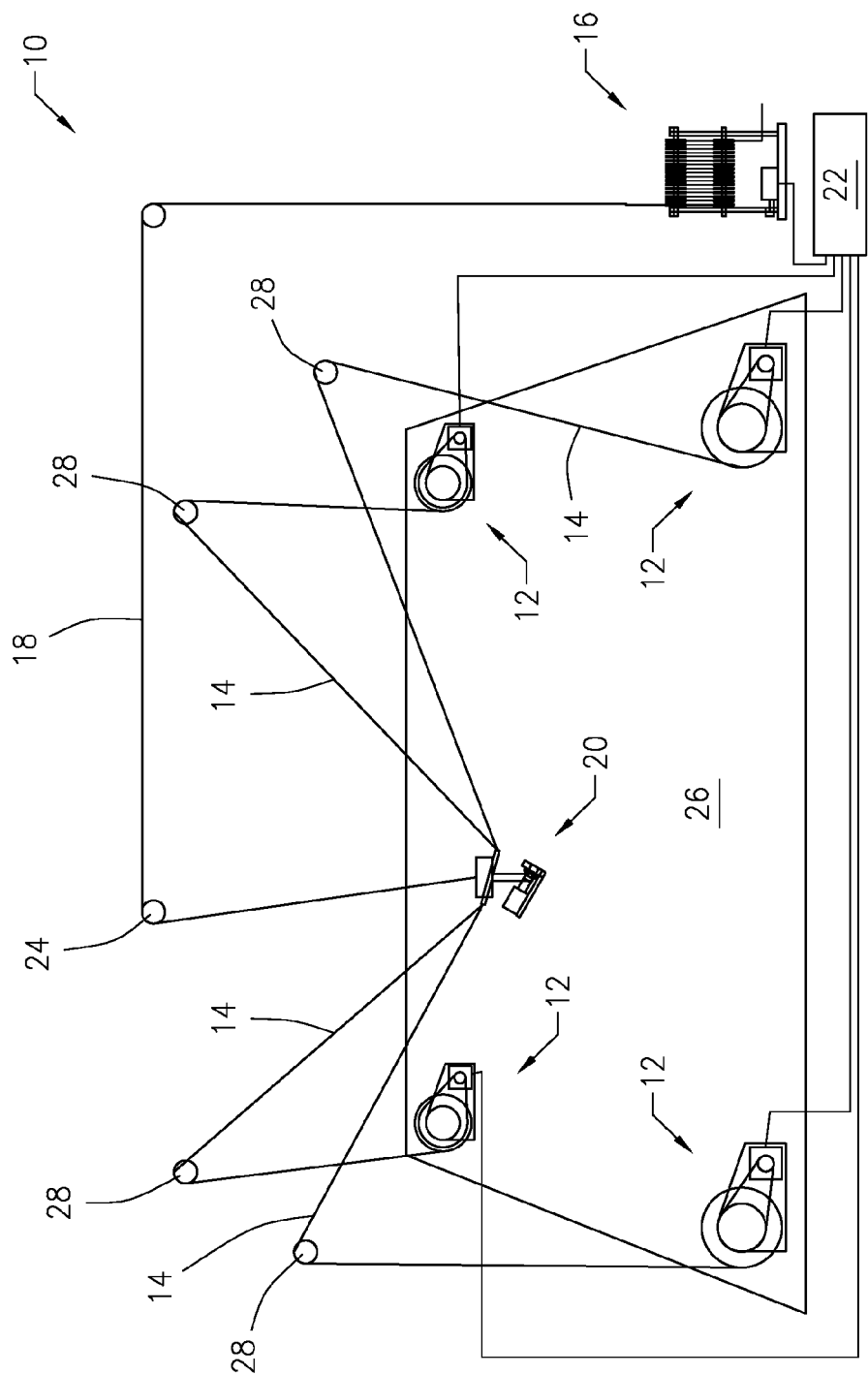
FIG. 1 is a perspective view of an example of an aerial camera system in accordance with an illustrative embodiment of the aerial camera system disclosed herein.

Referring to the figures of the drawings, wherein like numerals of reference designate like elements throughout the several views, and initially to FIG. 1, an aerial camera system 10 used in broadcast sporting events, film productions and entertainment events such as concerts and awards shows. The aerial camera system 10 includes a plurality main reels 12, a main cable 14 associated with each of the main reels 12, a camera interface/safety reel 16 (hereinafter referred to as the "safety reel"), a camera interface/safety reel cable 18 associated with the safety reel 16, and a stabilized camera head 20. For purposes of exemplification, the aerial camera system 10 is illustrated and discussed with reference to utilizing four (4) main drive reels, but should not be so limited; the aerial camera system 10 may be utilized with as few as two (2) main drive reels in keeping with the spirit and scope.

The camera head 20 is supported from the main cables 14 with the safety reel cable 18 providing power, data and video communication between the camera head 20 and a main computer system 22. Each of the main reels 12, the safety reel 16 and the camera head 20 are in communication with the main computer system 22. The computer system 22 controls the feeding and reeling in of the high strength, low weight main cables 14. Each of the main reels 12 are controlled by the computer system 22 so that an operator of the aerial camera system 10 simply needs to use a joystick to move the camera head 20 in three-dimensional space and the computer system 22 will determine how to command the main reels 12 in order to accomplish the movement of the camera head 20. Further, the computer system 22 controls the feeding and reeling in of the safety reel cable 18, which is typically rigged to a center system sheave 24 that is suspended directly over the center of the flight area 26 near the same height of the main system sheaves 28. Normally during operation, the safety reel 16 only follows the camera head 20 as it moves in three-dimensional space, keeping a constant, relatively low, tension on the safety reel cable 18 so that it does not in interfere with the movement of the camera head 20. However, in emergency mode, the safety reel cable 18 controlled by the safety reel 16 can support the weight of the camera head 20 and is used to slowly pull the camera head 20 up and out of the way so that it does not interfere with any activity below the flight area 26.

Each of the main reels 12 includes a large drum 30 that holds approximately 600 feet of main cable 14 after the main cable 14 has been routed from the main reel 12, up to the main system sheave 28 and down to the camera head 20, respectively. The main reels 12 may be located near the corners or ends of the flight area 26. Typically in a sporting event, the main reels 12 are located outside the stadium near the four corners of the stadium and the main cables 14 are run from the main reels 12 up to sheaves located on a support structure, such as light pole, and back down into the stadium to the camera head 20, which is then suspended over the field. The main reels 12 can then reel in or feed out up to the maximum length of the main cable 14, depending of the size of the flight area 26. The main cables 14 may be a lightweight, high-strength plastic rope that can support up to approximately 8000-pounds of tension, thereby allowing the aerial camera system 10 to be rigged lower and/or much farther than prior systems.

Overall smoothness and accurate positioning of the aerial camera system 10 relies heavily on accurately determining the three dimensional location of the main system sheaves 28 in the flight space 26. The main system sheaves 28 are the last sheaves in the aerial camera system 10 before the main cables 14 reach the camera head 20, as illustrated in FIG. 1. While several methods may be used for determining the positions of the main system sheaves 28, such as measuring the length of the main cable 14 feed from or reeled into the main reels 12, the most accurate method includes using surveying tools, such as optical or laser range finding components. However, these surveying tools have difficulty accurately measuring dark or non-reflective structures, especially in bright sunlight. By adding reflective tape or reflective surfaces (not shown) to the main system sheaves 28 of the aerial camera system 10, the accuracy of the survey measurements is significantly increased, thereby directly improving the performance of the aerial camera system 10. Utilization of reflective surfaces on the main system sheaves 28 eliminates the need to take multiple readings in order to determine the true position of the camera head within the three-dimensional flight space 26 and also reduces setup time of the aerial camera system 10.

Figure 2:
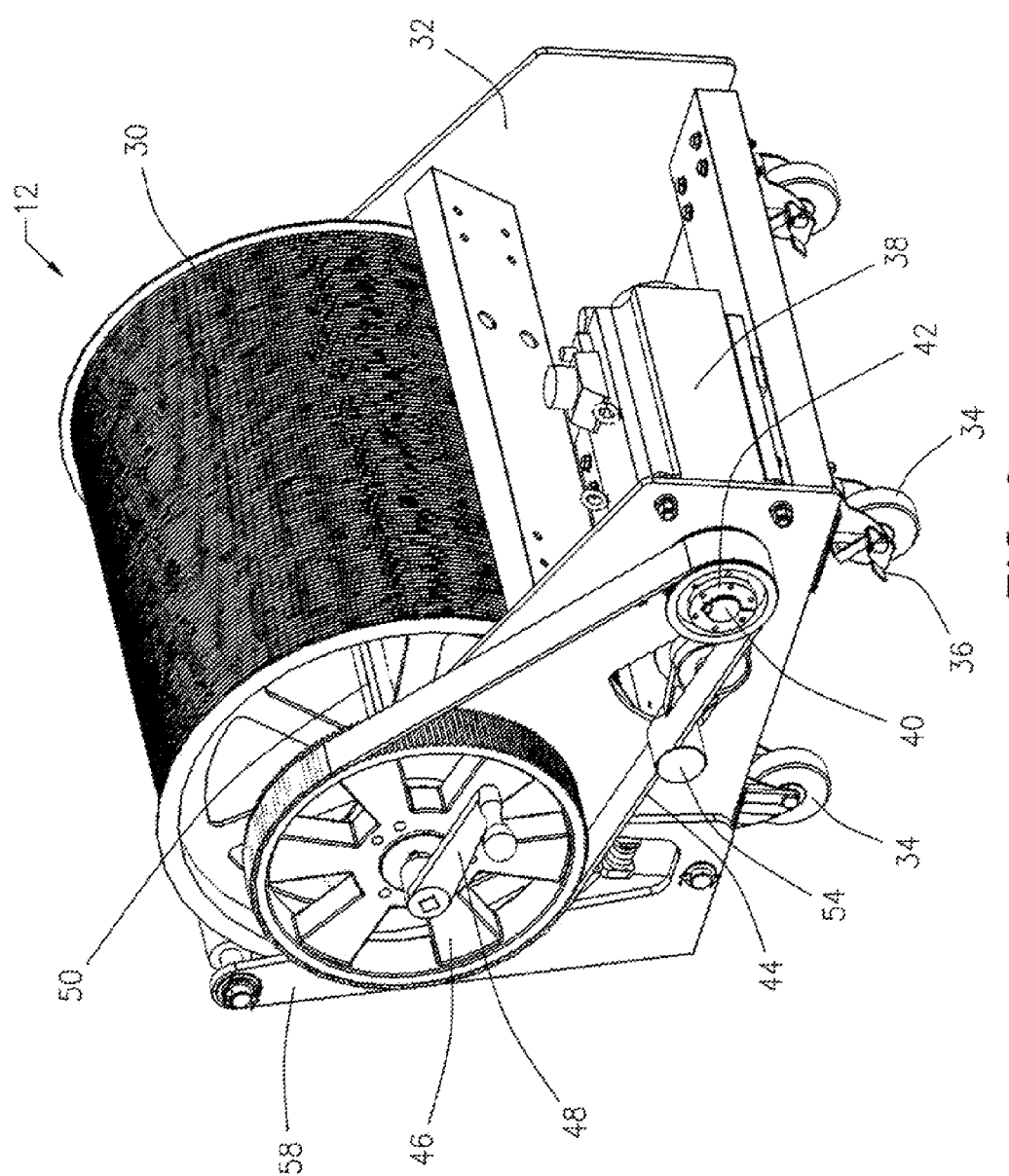
FIG. 2 is a perspective view of an example of a main reel in accordance with an illustrative embodiment of the aerial camera system disclosed herein.
Figure 3:
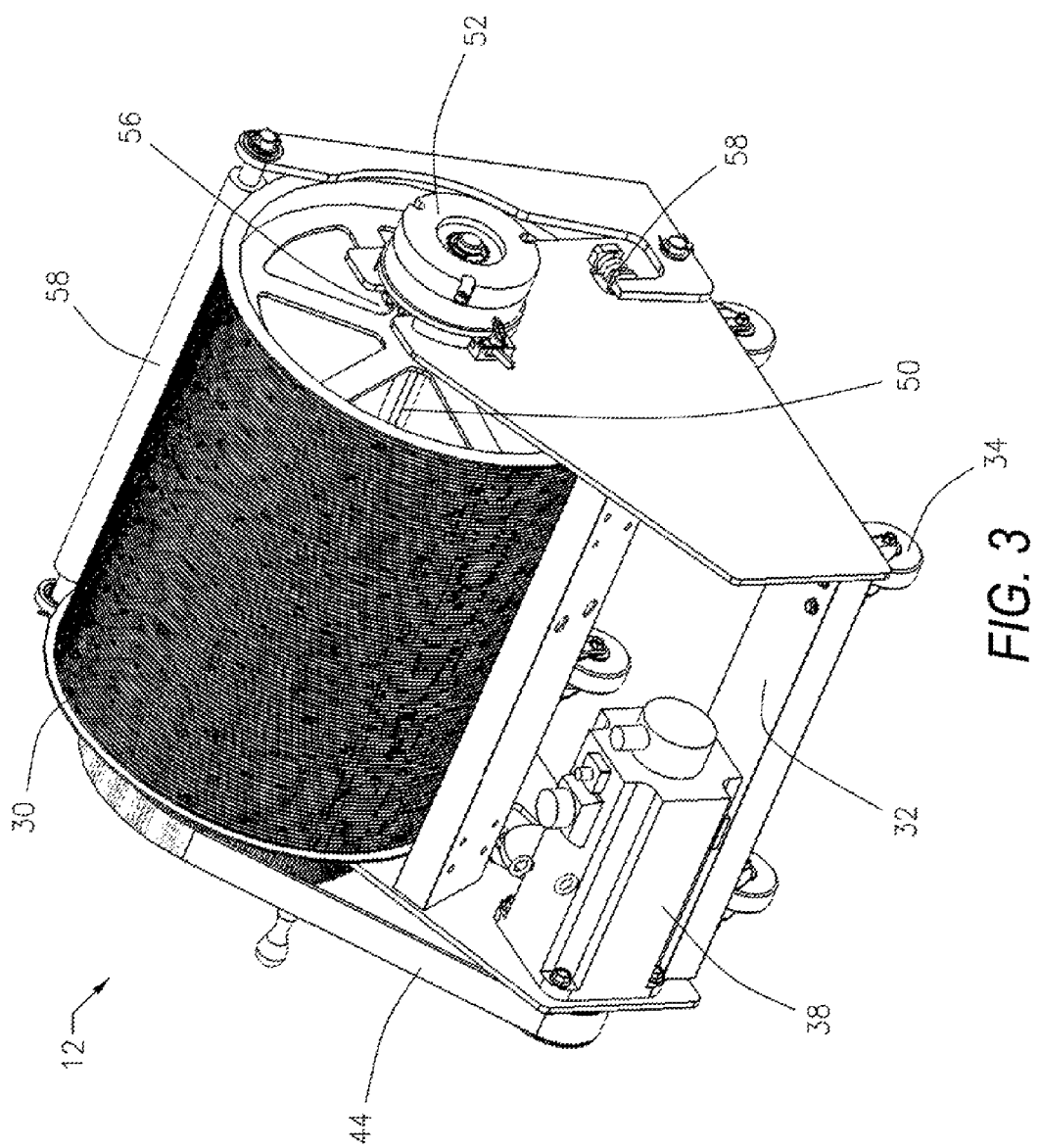
FIG. 3 is a perspective view of the example of the main reel shown in FIG. 2.

Referring now to FIGS. 2 and 3, the aerial camera system 10 includes a plurality of main reels 12, with each of the main reels 12 having a frame 32 with a plurality of casters 34 that enable the main reel 12 to be easily positioned. At least one of the casters 34 may include a caster brake 36 to prevent the main reel 12 from moving once properly positioned. Also attached to the frame 32 of each of the main reels 12 is a motor 38 having a drive shaft 40 connected to a drive sprocket 42. The motor 38 may be a large servo AC motor and amplifier sized so that the camera head 20 can be accelerated up to fifty (50) mph. A toothed drive belt 44 is engaged with the drive sprocket 42 and a main sprocket 46 in order to transfer power from the motor 38 to a large drum 30, which holds the main cable 14. Also attached to the frame 32 and engaged with the drive belt 44 is a belt tensioner 54. As illustrated in FIG. 2, the main sprocket 46 may also include a removable handle 48 in order to manually rotate the drum 30. The main sprocket 46 is connected to one end of a central axle 50 of the drum 30, and a main brake 52, such as an electromagnetic brake, is connected to the other end of the central axle 50 of the drum 30. Each respective end of the central axle 50 of the drum 30 may be secured within generally U-shaped slots 56 of the side walls of the frame 32, as shown in FIG. 3. The motor 38 of each of the main reels 12 is in communication with the computer system 22. As illustrated in FIGS. 2 and 3, the drum 30 may be a grooved drum 30 and the main reel 12 may include a spring-loaded cable keeper 58 to aid in keeping and winding of the main cable 14 about the drum 30 during operation.

Figure 4:
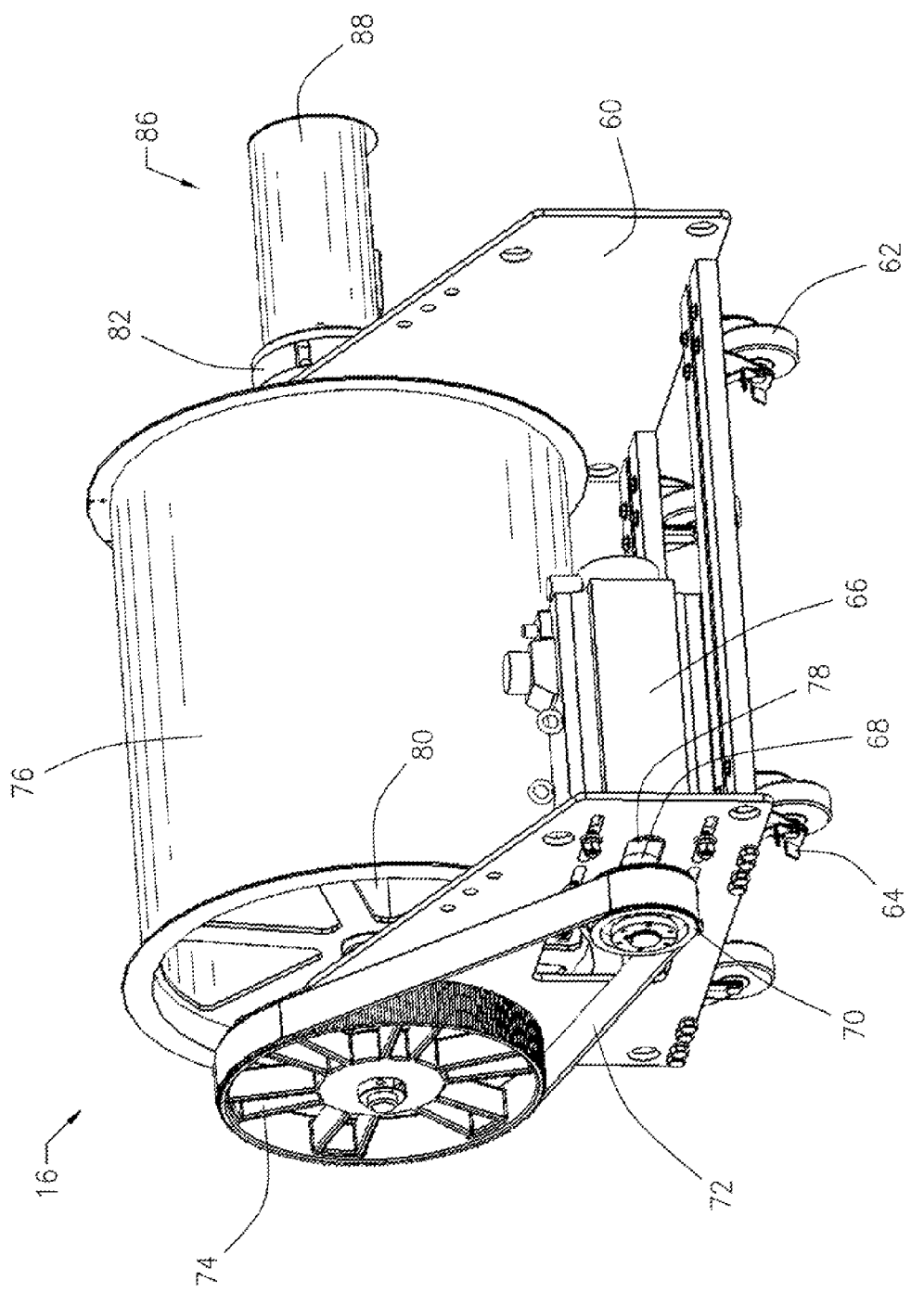
FIG. 4 is a perspective view of an example of a camera interface/safety reel in accordance with an illustrative embodiment of the aerial camera system disclosed herein.
Figure 5:
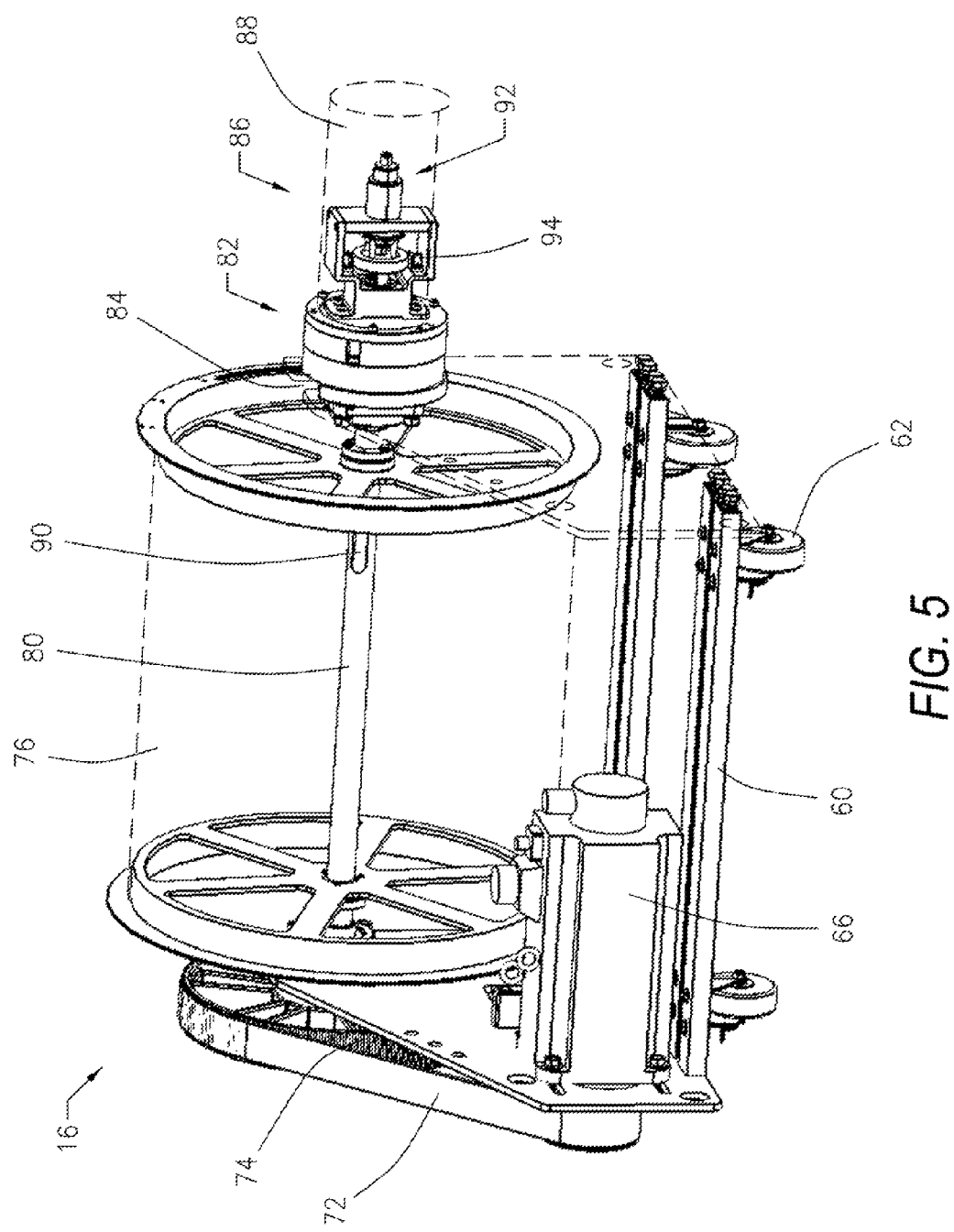
FIG. 5 is a partial cutaway perspective view of the example of the camera interface/safety reel shown in FIG. 4.
Figure 6:
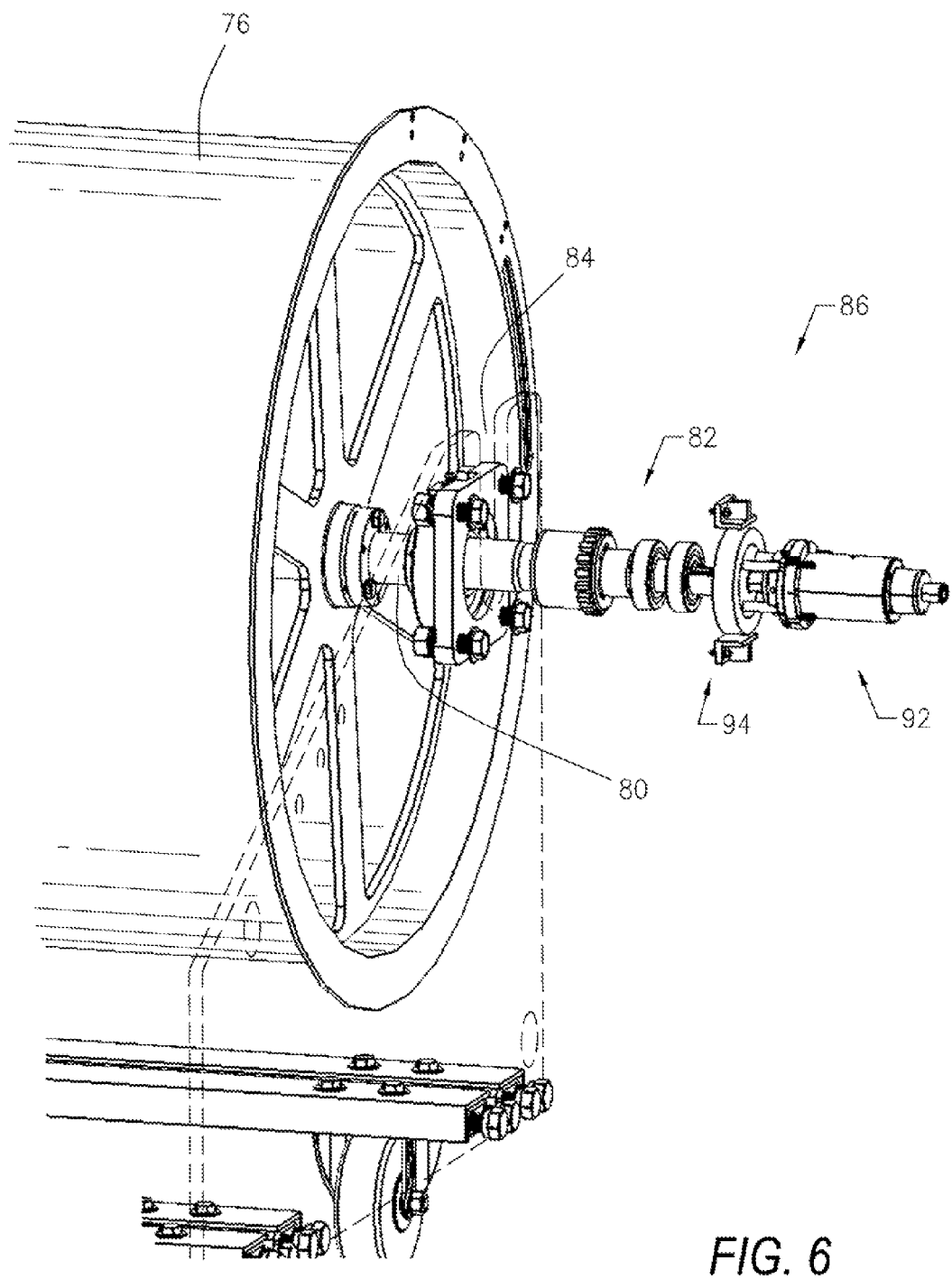
FIG. 6 is an enlarged partial perspective view of an example of a slip ring assembly of the camera interface/safety reel in accordance with an illustrative embodiment of the aerial camera system disclosed herein.

Referring now to FIGS. 4 through 6 illustrating an example of the safety reel 16 of the aerial camera system 10, similarly to the main reels 12, the safety reel 16 includes a frame 60 with a plurality of casters 62 that enable the safety reel 16 to be easily positioned. At least one of the casters 62 may include a caster brake 64 to prevent the safety reel 16 from moving once properly positioned. Also attached to the frame 60 of the safety reel 16 is a motor 66 having a drive shaft 68 connected to a drive sprocket 70. The motor 66 may be a large servo AC motor with an amplifier sized so that the safety reel cable 18 is capable of trailing the camera head 20, which may be traveling up fifty (50) mph. A toothed drive belt 72 is engaged with the drive sprocket 70 and a main sprocket 74 in order to transfer power from the motor 66 to a large drum 76, which wraps and holds the safety reel cable 18. The safety reel 16 may include a belt tensioner (not shown) similar to the main reels 12 or the frame 60 of the safety reel 16 may include an elongate adjustment opening 78 through which the drive shaft 68 of the motor 66 protrudes to connect to the drive sprocket 70. Likewise, the motor 66 may be adjustably attached to the frame 60 so that the motor 66 may be moved fore and aft in order to tension the drive belt 72 around the drive sprocket 70 and the main sprocket 74. The main sprocket 74 is connected to one end of a central axle 80 of the drum 76, and a brake 82, such as an electromagnetic brake, is connected to the other end of the central axle 80 of the drum 76. Each respective end of the central axle 80 of the drum 76 may be secured within generally U-shaped slots 84 of the side walls of the frame 60, as shown in FIGS. 5 and 6. The motor 66 of the safety reels 16 is in communication with the computer system 22.

The safety reel 16 also includes a slip ring assembly 86 attached to the central axle 80 at the same end as the brake 82. The slip ring assembly 86 may be housed within a protective housing 88 in order to shelter it from the surrounding elements. The slip ring assembly 86 of the safety reel 16 allows for continuous communication between the safety reel cable 18 and the main fiber optic, copper and other electrical cables from a main control trailer. Since the main fiber optic, copper and other electrical cables from the main control trailer are static, the slip ring assembly 86 allows their electrical power and data and video signals to be transferred to the safety reel cable 18, which is being feed from and reeled onto the rotating drum 76 of the safety reel 16 during operation. After connecting to the slip ring assembly 86, the safety reel cable 18 is routed within the central axle 80 and out of an aperture 90 in order to be wound about the drum 76 of the safety reel 16. The slip ring assembly 86 of the safety reel 16 includes at least a fiber optic slip ring 92 in order to transfer the data and video signals from the main fiber optic cable to the safety reel cable 18 and a copper slip ring 94 in order to transfer the electrical power from the main power cable to the safety reel cable 18.

Figure 7:
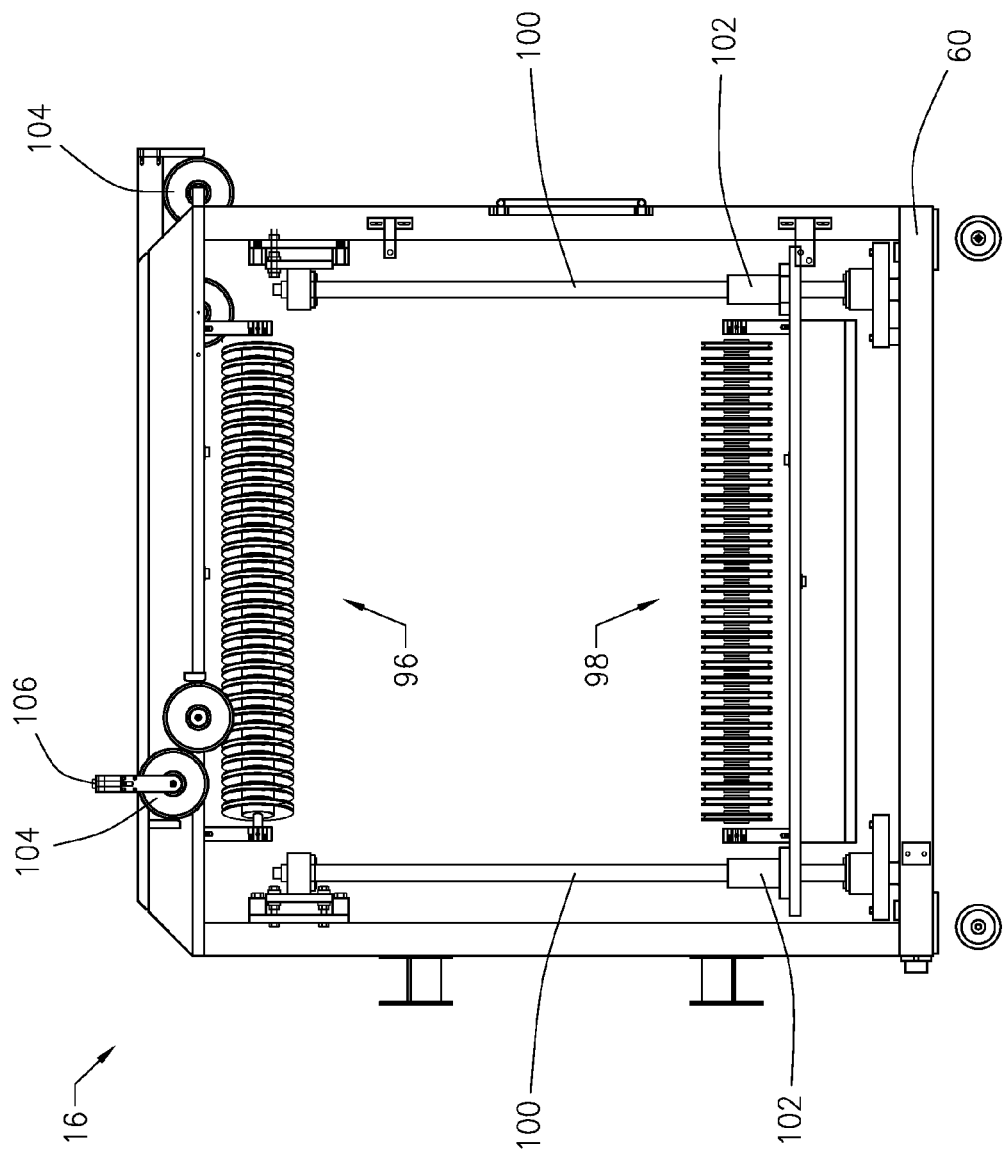
FIG. 7 is a perspective view of another example of a camera interface/safety reel in accordance with an illustrative embodiment of the aerial camera system disclosed herein.

FIG. 7 illustrates another example of the safety reel 16 of the aerial camera system 10. The safety reel 16 includes a fixed array of sheaves 96 and a movable array of sheaves 98, similar to a block and tackle arrangement. As illustrated, the fixed array of sheaves 96 may be angled to eliminate safety reel cable 18 twist found in traditional block and tackle arrangements. The movable array of sheaves 98 and the fixed array of sheaves 96 may be horizontal and aligned in parallel. The movable array of sheaves 98 are slidably mounted to guide rails 100. Guide rails 100 may be vertically oriented, aligned in parallel and secured to the frame 60 of the safety reel 16. By way of example, the movable array of sheaves 98 may be slidably mounted to guide rails 100 using linear motion bearings, slide bearings, rolling-element bearings or plane bearings (collectively 102). Alternatively, the guide rails 100 may be replaced with ball screws for moving the movable array of sheaves 98 in relation to the fixed array of sheaves 96, in which case the safety reel 16 may include a drive shaft (not shown) connected to the motor 66 in order to translate the rotational motion of the drive shaft to linear movement of the movable array of sheaves along the ball screws. In this exemplified version of the safety reel, the safety reel 16 is designed using multiple wraps on the fixed array of sheaves 96 and the movable array of sheaves 98 so that safety reel cable 18 can be pulled in or let out, yet the safety reel cable 18 to the main control trailer from the safety reel 16 is anchored to the ground or similar support structure. During operation, the safety reel cable 18 is fed through a series of main sheaves, collectively 104, from the main control trailer to the flight area 26. One of the main sheaves 104 may also include a tension sensor 106 that accurately measures the tension on the safety reel cable 18 regardless of the angle from which safety reel cable 18 enters or exits the safety reel 16, thereby keeping the safety cable wound about the fixed array of sheaves 96 and the movable array of sheaves 98 in a controlled and consistent manner. Unlike the example of the safety reel 16 illustrated in FIGS. 4 though 6, the example of the safety reel 16 shown in FIG. 7 does not require a slip ring assembly 86.

Figure 8:
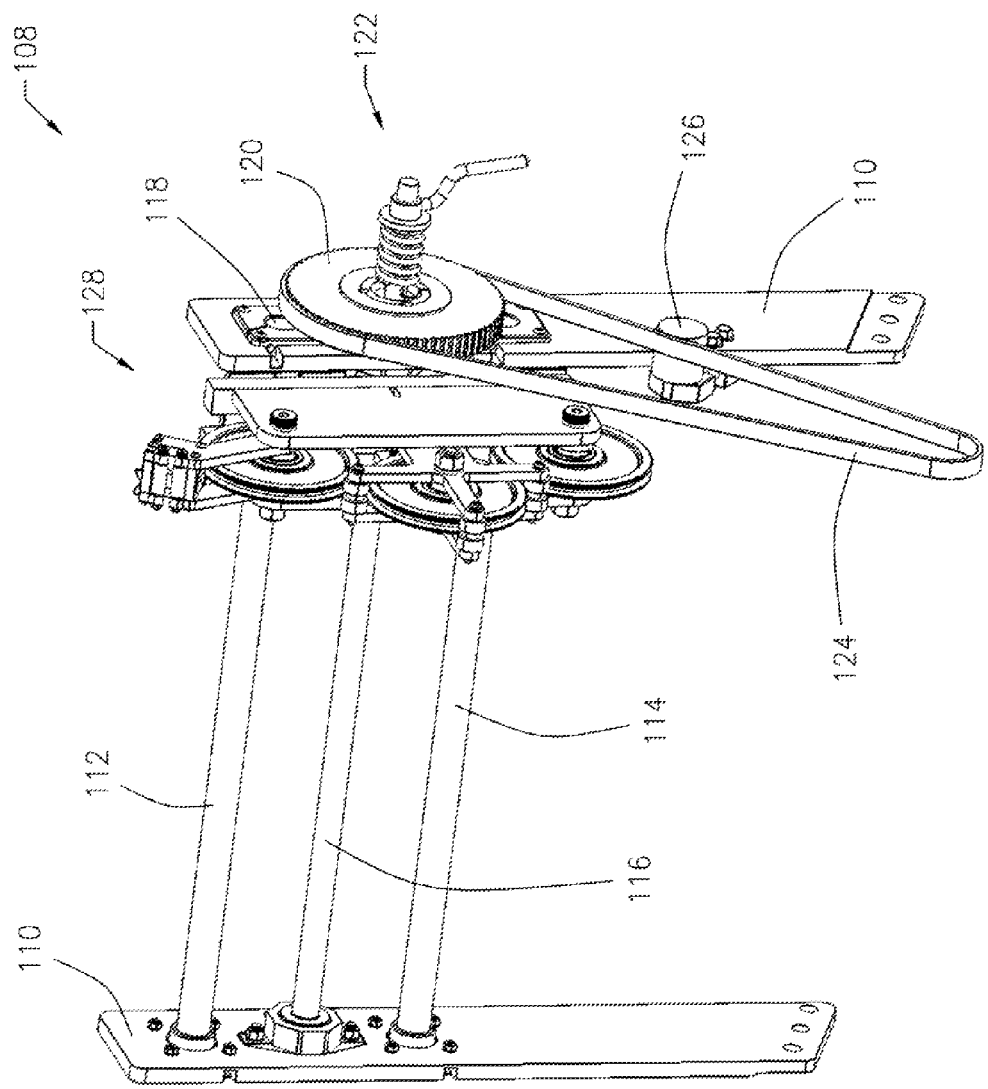
FIG. 8 is a perspective view of an example of a level wind assembly in accordance with an illustrative embodiment of the aerial camera system disclosed herein.
Figure 9:
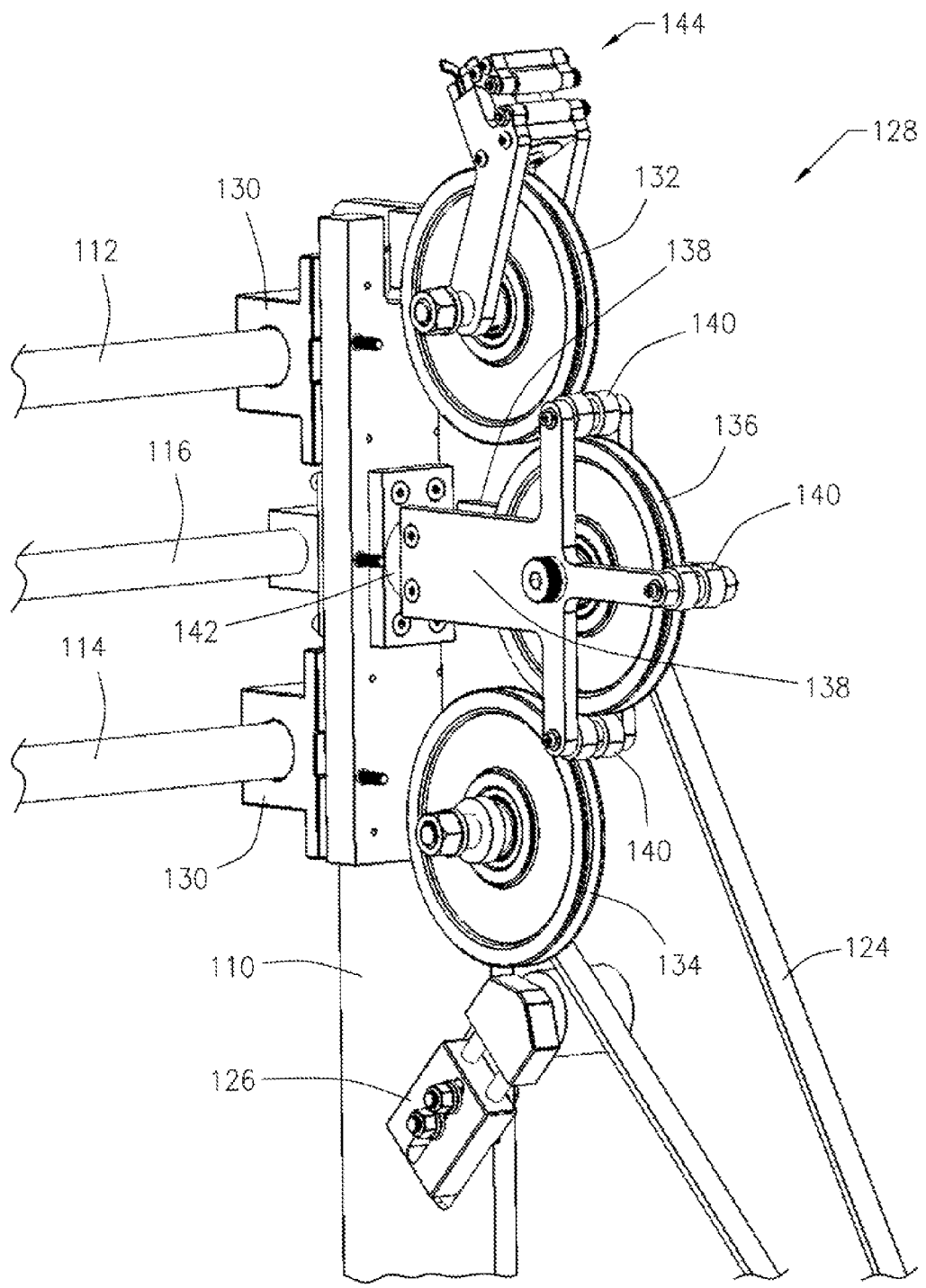
FIG. 9 is an enlarged partial perspective view of an example of a tensioning assembly of the level wind assembly in accordance with an illustrative embodiment of the aerial camera system disclosed herein.

Referring now to FIGS. 8 and 9, the aerial camera system 10 may further include a level wind assembly 108 attached to the frame 60 of the safety reel 16 to keep the safety reel cable 18 wound about the drum 76 in a controlled and consistent manner during operation. The level wind assembly 108 may also be attached to the frame 32 of each of the main reels 12, in which case, the spring-loaded cable keeper 58 may be omitted. The level wind assembly 108 includes a pair of substantially upright supports 110 aligned in parallel, with an upper linear shaft 112 and a lower linear shaft 114 rotatably attached there between. Also rotatably attached between the upright supports 110 intermediate of the upper linear shaft 112 and the lower linear shaft 114 is an auto-reversing ball screw 116. One end of the ball screw 116 protrudes through an elongate adjustment opening 118 in one of the upright supports 110 and is connected to a drive sprocket 120. The ball screw 116 may also include a manual clutch assembly 122 in order to adjust the friction force from the drive sprocket 120 to the ball screw 116. A toothed drive belt 124 is engaged with the drive sprocket 120 of the level wind assembly 108 and is also engaged with the central axle 80 of the safety reel 16 intermediate of the frame 60 and the drive sprocket 74. If the level wind assembly 108 is utilized with the main reels 12, the drive belt 124 would similarly engage the central axle 50 of the main reel 12 intermediate of the frame 32 and the drive sprocket 46. As such, the rate of rotation of the drive sprocket 120 of the level wind assembly 108 is synchronized with the rate of rotation of the drive sprocket 74 of the safety reel 16 (and the drive sprocket 46 of each of the main reels 12, if applicable), all of which are powered by the motor 66 (or the motor 38, if applicable). Also attached to the upright support 110 having the elongate adjustment opening 118 is a belt tensioner 126 that is engaged with the drive belt 124.

Moreover, the level wind assembly 108 includes a tensioning assembly 128 slidably engaged with the upper linear shaft 112 and the lower linear shaft 114. The tensioning assembly 128 is also engaged with the ball screw 116, which causes the tensioning assembly 128 to slide along the upper liner shaft 112 and the lower linear shaft 114. The tensioning assembly 128 may be respectively slidably mounted to the upper linear shaft 112 and the lower linear shaft 114 using linear motion bearings, slide bearings, rolling-element bearings or plane bearings (collectively 130). The tensioning assembly 128 also includes an upper sheave 132 and a lower sheave 134 being substantially axially aligned and an intermediate sheave 136 being offset from and aligned on a parallel axis to the upper sheave 132 and the lower sheave 134. A cable guide assembly 144 may be also provided for guiding the safety reel cable 18 (or main cable 14) into or out of the upper sheave 132. A pair of opposing tension sensor plates 138 is joined via a series of groove rollers 140 and is in contact with a solid state tension sensor 142, which is in communication with the computer system 22 and which accurately measures the safety reel cable 18 (or main cable 14) tension as it passes along the intermediate sheave 136 regardless of the angle from which the safety reel cable 18 (or main cable 14) enters or exists the level wind assembly 108. The upper sheave 132, the lower sheave 134 and the intermediate sheave 136, with the tension sensor 142 attached, of the tensioning assembly 128 of the level wind assembly 108 are arranged so that as the safety reel cable 18 (or the main cable 14) winds through the level wind assembly 108, the tension from the safety reel cable 18 (or the main cable 14) always compresses the tension sensor 142 in line with its sensing axis regardless of how the cable 14 or 18 enters or exits the level wind assembly 108. While it is possible to extrapolate cable tension from the drive motor 66 (or motor 38) torque readings to provide accurate static measurements, when the drum 76 (or drum 30) is moving or accelerating/decelerating, these measurements are much less accurate. By reading the tension directly on the cable 14 or 18, a more accurate measurement of cable tension is achieved, which allows for advanced control algorithms, safety systems and better feedback to the system operator. Using the tension sensor 142 to directly read tension on the cable 14 or 18 enhances the responsiveness of the safety reel 16 (or the main reel 12) of the aerial camera system 10, which can in turn use this accurate, instant cable tension measurement to sense system problems faster and begin the active safety procedures of lifting the camera head 20 up and out of the way of any people or activity on the field.

The camera head 20 of the aerial camera system 10 is fully stabilized in three linear and three angular (six degree of freedom) axis providing a stable and steady video image regardless of minor fluctuations in camera movement. The aerial camera system 10 also provides a full set of positional data (X, Y, Z, pan, tilt, zoom and focus) to the video broadcaster for use in adding graphic overlays to the video image. The stabilized camera head 20 is designed to eliminate minor disturbances from affecting the video image.

The camera head 20 may include an onboard computer system that controls stabilization, operator's commanded movements, position feedback and interfaces with the main computer 22. The camera head 20 may be powered by a DC voltage supplied through the safety reel cable 18 of the safety reel 16 and all video and data is interfaced using fiber optic cables included in the safety reel cable 18 of the safety reel 16. Power and data may be transferred through an electrical slip ring so that the camera pan position can be constantly rotated through a full 360 degrees.

Each of the camera control positions (pan, tilt and roll) may be controlled using brushless DC electric motors, similar to those that provide stabilization control. An operator of the aerial camera system 10 can command a pan, tilt or roll movement and even these are stabilized while moving so that the image moves in smoothly. Each control position may also include an absolute encoder and a known linkage to the rest of the aerial camera system 10 so that full positional data, relative to the surface of the field, can be transmitted back to the main computer system 22 and on to the broadcast video truck. The camera lens may include a full servo motor control of the zoom and focus (and iris) with absolute encoder feedback so that these positions can also be transmitted. By adding these to the X, Y, Z position data, a full set of data describing exactly where the camera head 20 and the lens focal point are in three dimensional space, relative to a known surface, may be utilized to add on-field graphics, such as the First and Ten Line used in televised football or other CGI graphics used in the film and entertainment industries.

Figure 10:
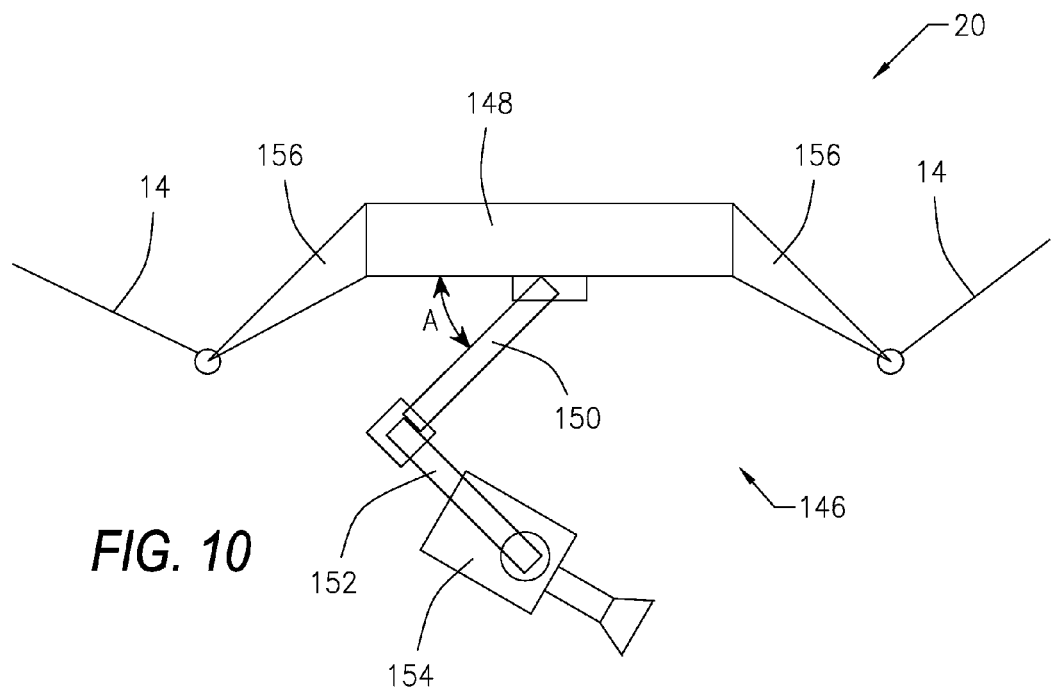
FIG. 10 is a side perspective view of an example of a camera head in accordance with an illustrative embodiment of the aerial camera system disclosed herein.

The camera head 20 of the aerial camera system 10 may utilize various platform stabilization methods, all of which utilize a lower camera assembly 146 having a main platform 148, a pan support arm 150 rotatably connected to a bottom of the main platform 148, a tilt support arm 152 rotatably connected to the pan support arm 150 and a camera 154. For example, the camera head 20 may include the main platform 148 having fixed cantilevered arms 156 rotatably connected, respectively, to the main cable 14 in order to adjust the pull closer to the center of gravity of the platform 146, as shown in FIG. 10. By way of another example, the main platform 148 may have articulating platform arms 158 to adjust the level of the platform, as shown in FIG. 11, or angled rods 160 may be rotatably connected intermediate of the main platform 148 and a cable connection platform 162 to adjust the level, as shown in FIG. 12.

Figure 11:
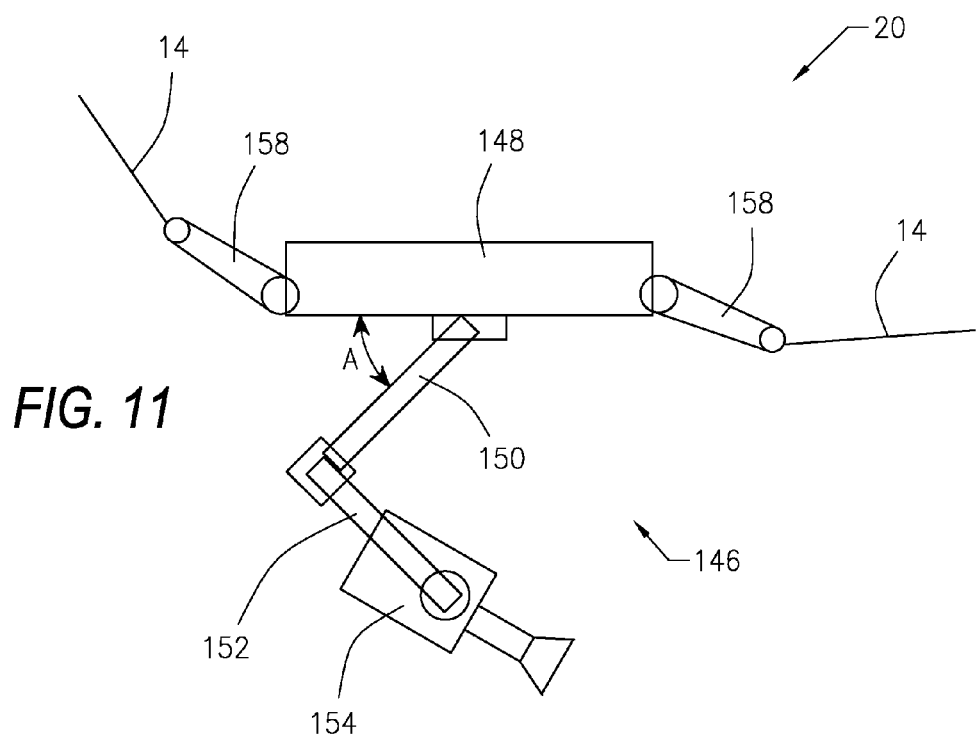
FIG. 11 is a side perspective view of another example of a camera head in accordance with an illustrative embodiment of the aerial camera system disclosed herein.
Figure 12:
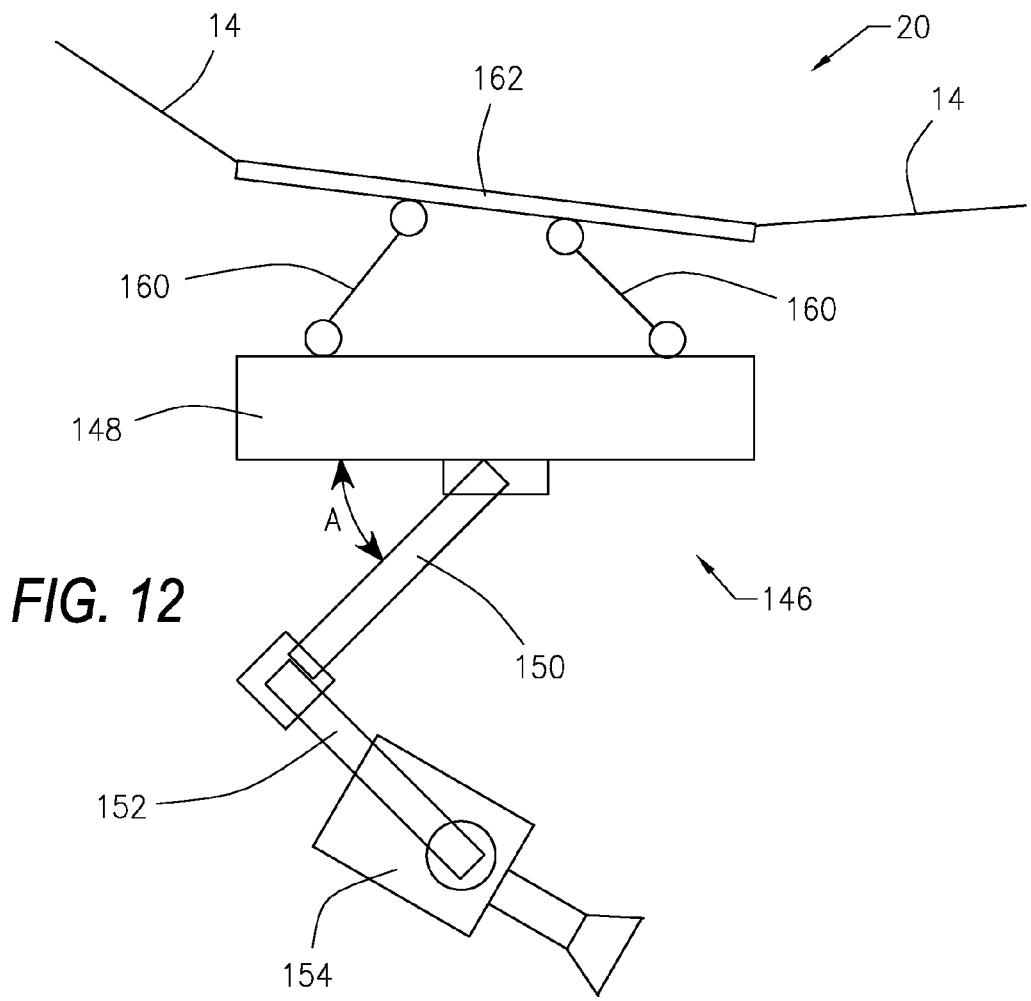
FIG. 12 is a side perspective view of another example of a camera head in accordance with an illustrative embodiment of the aerial camera system disclosed herein.

In each of the camera heads 20 illustrated in FIGS. 10 through 12, the roll axis A is rotated 45 degrees from the horizon to compensate for nominal camera positions and to eliminate gimbal lock. Further, each of the camera heads shown in FIGS. 10 through 12 may include multiple position sensors (e.g., gyroscopes and accelerometers) that are used in the active stabilization control loop. For example, the camera head 20 may be held in a stable position by reading two high rate accelerometers. One accelerometer may be mounted on the main platform 148 and one may be mounted directly on the camera 154, and adjusting the pan, tilt and roll position to compensate for any unwanted movement. A high stability solid state gyro may be used to compensate for drift in the aerial head 20, which constantly readjusts the aerial camera system 10 so that the camera position is correlated to the earth's surface, thereby keeping the camera head 20 level and pointed in the known direction.

Figure 13:
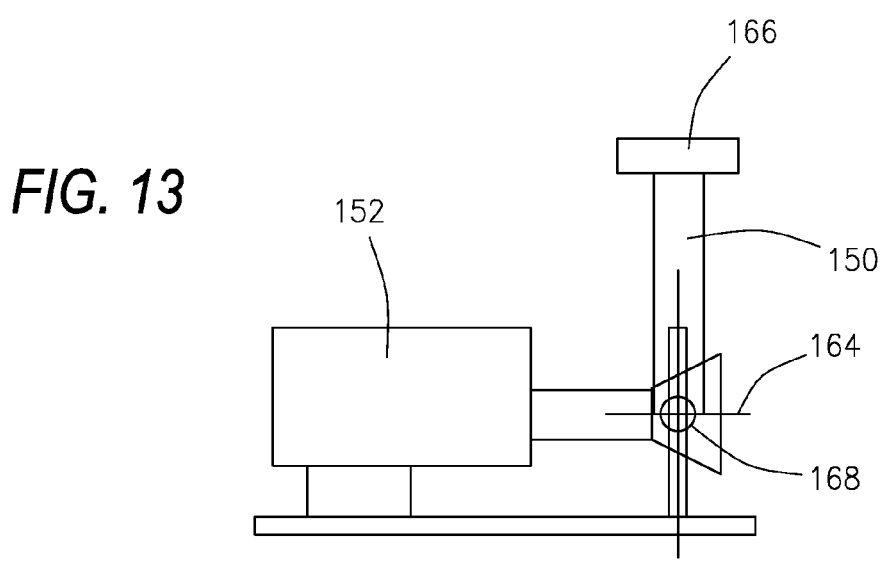
FIG. 13 is a schematic view of an example of a camera head nodal point rotation in accordance with an illustrative embodiment of the aerial camera system disclosed herein.

Furthermore, the camera head 20 of the aerial camera system 10 may include various camera movement methods, such as three axis control with 45 degree angled roll axis before tilt axis, as shown in FIGS. 10 through 12, or three axis control with orthogonal roll axis after tilt axis, as shown in FIG. 13. In the later, the camera head 20 of the aerial camera system 10 provides for camera 152 rotation about the lens nodal point 164 in all three axis (i.e., pan axis 166 and tilt and roll axis 168), wherein rotation about the lens nodal point 164 eliminates parallax error in the image.

Turning now to FIGS. 14 through 18 illustrating another example of the camera head 20, the aerial camera system 10 may include a camera head 20 that utilizes a two-axis gimbal assembly 168 to adjust the level of the main platform 148. In this example, the camera head 20 includes the lower camera assembly 146, an upper camera assembly 166 and a two-axis gimbal assembly 168. As shown, the upper camera assembly 166 may be enclosed in an environmentally protected housing 170 to ensure that rain and moisture do not damage the electronics and so that rain drops, dust, etc. do not interfere with the image quality.

Figure 15:
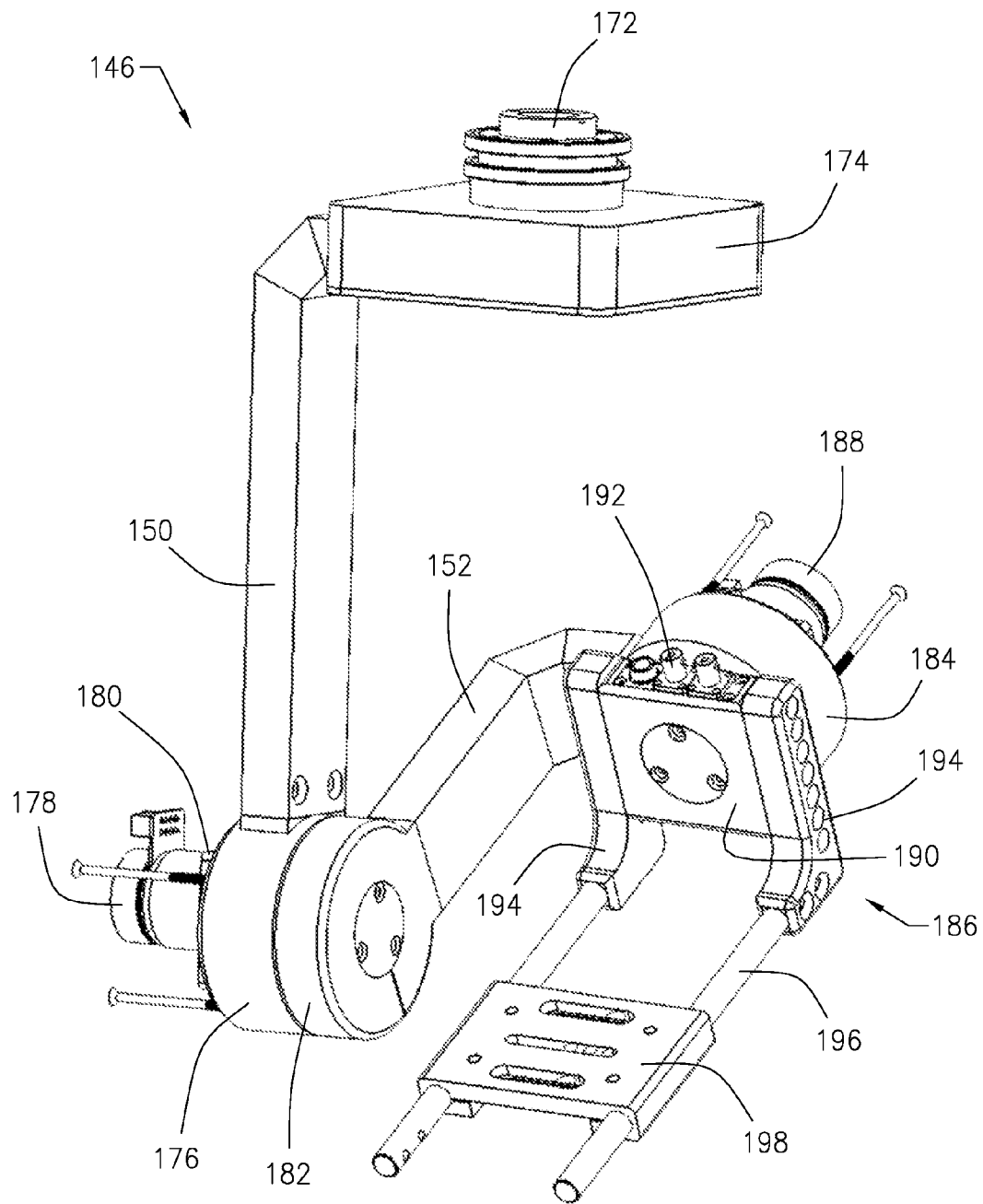
FIG. 15 is a perspective view of a lower camera assembly of the camera head shown in FIG. 14.

Referring to FIG. 15, the lower camera assembly 146 of the camera head 20 may include a pan shaft 172 extending through and rotatably connected to the main platform 148 via a pan bracket 174. The pan support tube 150 is fixed at one end to the pan bracket 174 and pivotally connected via a pan/tilt shaft bracket 176 to one end of the tilt support tube 152. The pan tube 150 is rotated with respect to the tilt tube 152 using a tilt motor 178 having a drive shaft (not shown). The tilt motor 178 is secured to the pan/tilt shaft bracket 176 using a tilt motor bracket 180 and a pan/tilt shaft bracket clamp 182, thereby enabling the pan support tube 150 to pivot about the drive shaft of the tilt motor 178 in relation to the tilt support tube 152. The opposing end of the tilt support tube 152 is pivotally connected via a tilt/roll shaft bracket 184 to a camera bracket assembly 186. The camera bracket assembly 186 is rotated with respect to the tilt tube 152 using a roll motor 188 having a drive shaft (not shown), which is passed through the tilt/roll shaft bracket 184 and is connected to a roll camera bracket 190. The roll camera bracket 190 includes a connector assembly 192 that patches the camera 154 video connections to the camera head 20. The camera bracket assembly 186 may also include a pair of side brackets 194 fixed to the roll camera bracket 190 and a pair of camera mounts 196 respectively connected to the side brackets 194. The camera mounts 196 include a camera mount platform 198 which supports the camera 154.

Figure 16:
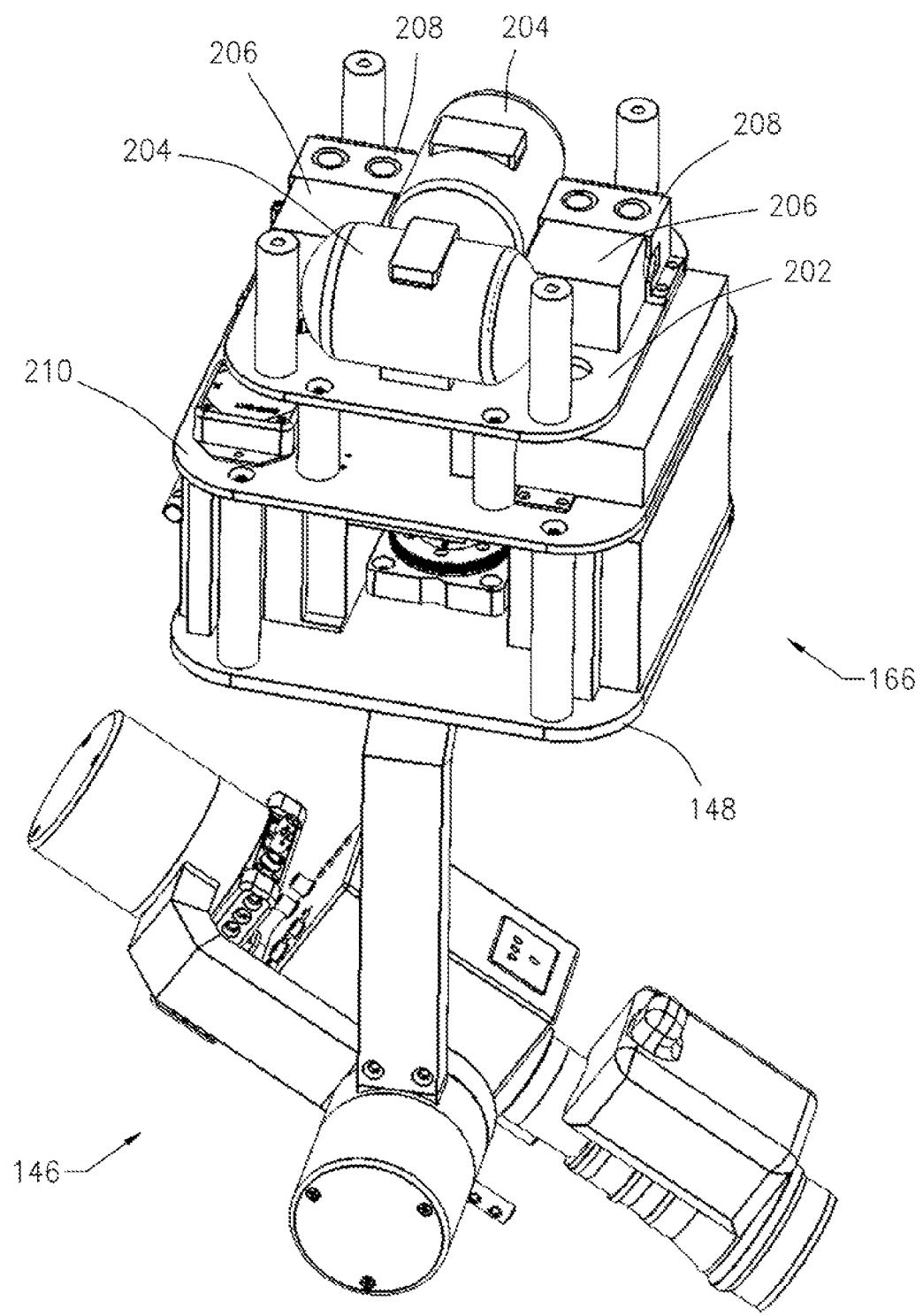
FIG. 16 is a perspective view of a gyro plate of an upper camera assembly of the camera head shown in FIG. 14.

Referring to FIG. 16, the upper camera assembly 166 includes a weight plate 200 that allows for additional balancing weights to be added for adjustment of the camera head 20. The upper camera assembly 166 also includes a gyro plate 202 mounted thereon in a spaced relation from the weight plate 200. An electronics plate 210 may also be mounted on the upper camera assembly 166 which provides a platform the electronics of the camera head 20. In spaced relation from the electronics plate 210 is the main platform 148 of the upper camera assembly 166 of the camera head 20 of the aerial camera system 10. The camera head 20 of the aerial camera system 10 may utilize spinning mass gyroscopes 204 mounted to the gyro plate 202, each respectively including a power inverter 206, which is mounted to the gyro plate 202 using an inverter bracket 208.

Figure 17:
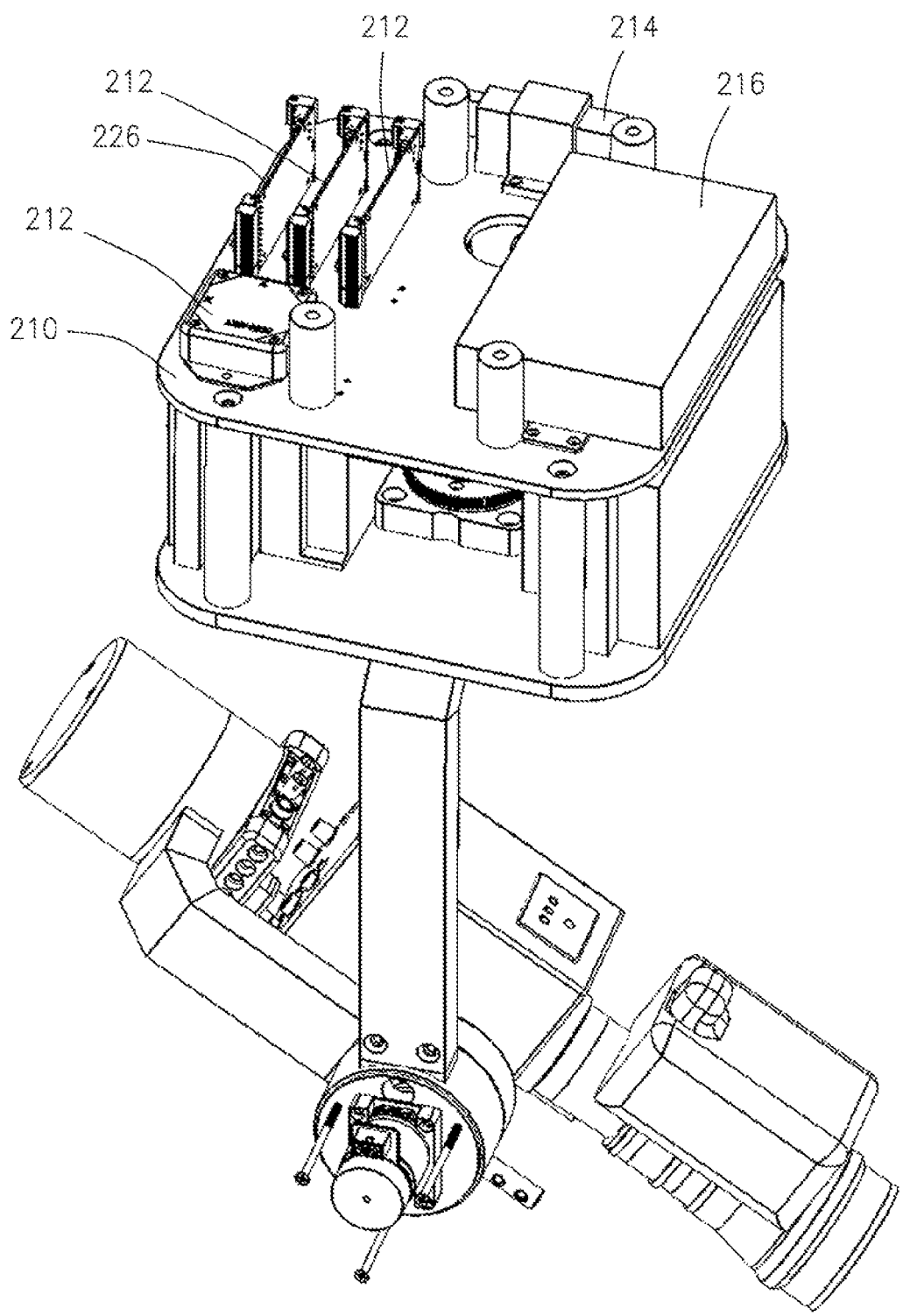
FIG. 17 is a perspective view of an electronics plate of the upper camera assembly of the camera head shown in FIG. 14.

Turning now to FIG. 17, the electronics plate 210 of the upper camera assembly 166 may include a series of motor controllers, collectively 226, with two (2) of the motor controllers 226 controlling X-Y axis movements and the other motor controller 226 controlling Z-axis movement. Also mounted on the electronics plate 210 may be a fiber optic to copper Ethernet connector 214, along with an Ethernet to serial converter 216. Current broadcast quality camera systems utilize a separate camera controller unit that allows the production crew to adjust the camera's video image, including iris setting, color settings, filter settings, etc. This camera controller unit ("CCU" or sometimes called the "paint box") is typically located in the broadcast production truck and is used along with controllers for other cameras to get a high quality image that is consistent between the different cameras (i.e., the color of the green grass in football is exactly the same for all camera video images). The interface between the CCU and the camera itself is typically a standard serial interface (e.g., RS-485) that supports the long cable distances between the CCU and the camera. Current camera systems require a dedicated signal path (fiber optic, copper cable or wireless) for this control. This is in addition to other camera control interfaces, such as zoom, focus or, in the case of a remote controlled camera, pan, tilt or roll. By using a dedicated signal path, the overall system wiring is increased and additional failure points are introduced (more connectors, cables, etc.). The aerial camera system 10 may utilize a method that allows the signaling from the CCU to be incorporated into the existing signal path for the other camera head 20 functions, and therefore eliminates the need for a dedicated signal path and increases the overall system's reliability. The CCU serial data is interfaced to the main computer system 22 of the aerial camera system 10, which incorporates this data into the high speed Ethernet signal path that already exists between the main computer system 22 and the camera head 20. The data is then retrieved from the Ethernet signal path at the camera head 20 and interfaced directly to the camera 154, resulting in effectively the same control interface as if the CCU were connected directly through its own dedicated line.

By utilizing the foregoing method, the aerial camera system 10 has access to the CCU data and can interpret this data in order to provide visual feedback to the system operators of the current camera control unit settings (this data is not typically available since the CCU is located in the broadcast truck and is not physically visible to the system operators). Additionally, this data can be intercepted and controlled by the system operators by using software that overrides the CCU unit. This allows the system operators to selectively take control of various camera control functions, such as iris control, that is typically available to stationary camera operators, but not to remote camera operators (simply because most remote cameras have all their camera control functions controlled only by the CCU). This method allows the aerial camera system 10 operators to control specific camera functions that are more appropriately controlled by them instead of the broadcast production crew. The ability to selectively control camera functions at the system operator's station allows quicker adjustments to changes in lighting, etc., as the camera head 20 moves and therefore enhances the overall video image and broadcast presentation.

Figure 18:
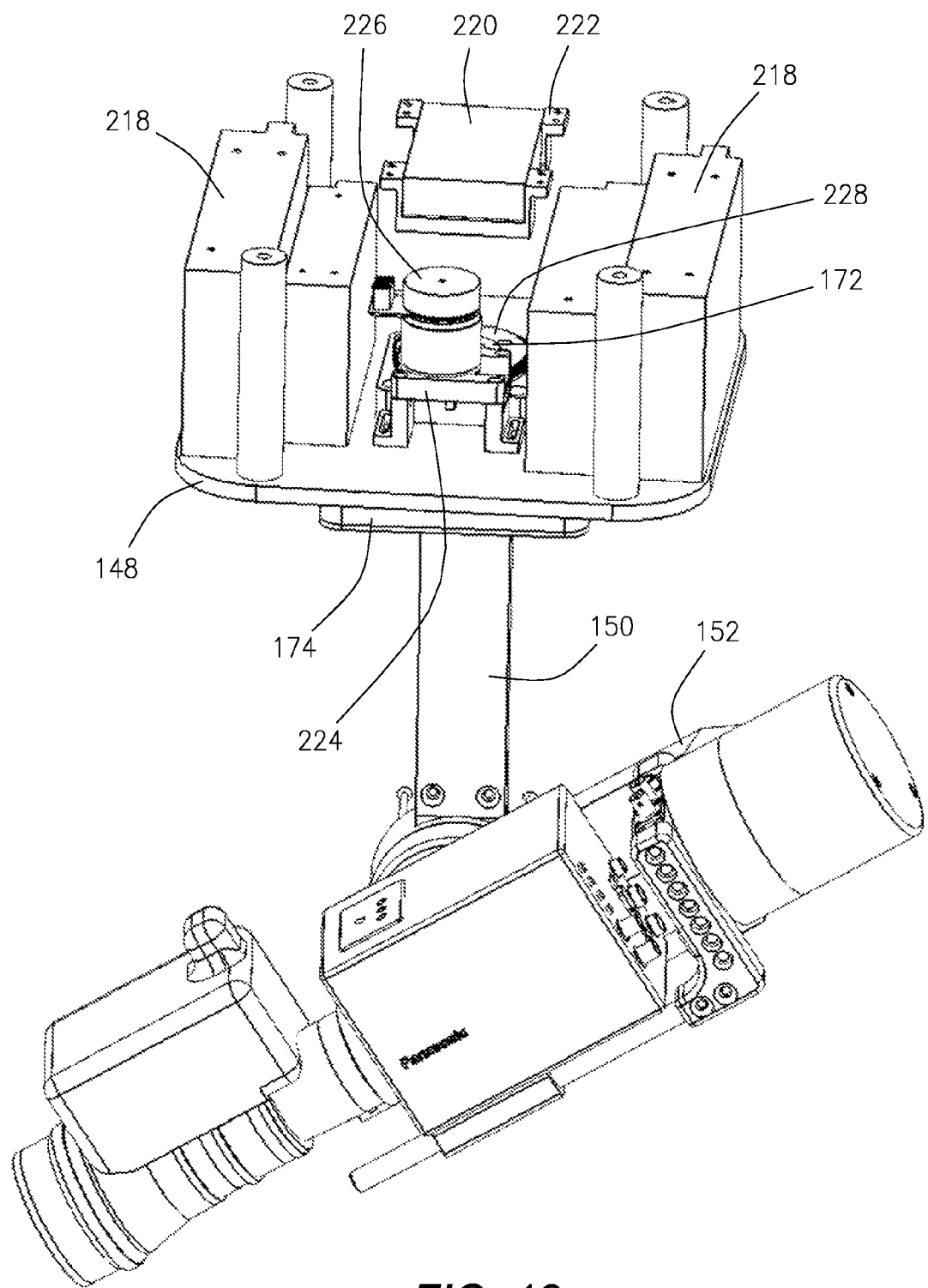
FIG. 18 is a perspective view of a main platform of the camera head shown in FIG. 14.

Referring now to FIG. 18, the upper camera assembly 166 of the camera head 20 includes an array of power supplies 218 mounted on the main platform 148. A video converter 220 may also be include and mounted to an underside of the electronics plate 210 using a video converter bracket 222. Also mounted on the main platform 148 via a pan motor bracket 224 is a pan motor 226. The pan motor 226 includes a drive shaft (not shown) in communication with an annular toothed sprocket 228, which in turn is joined to the pan shaft 172 for rotating the pan support tube 150.

Figure 14:
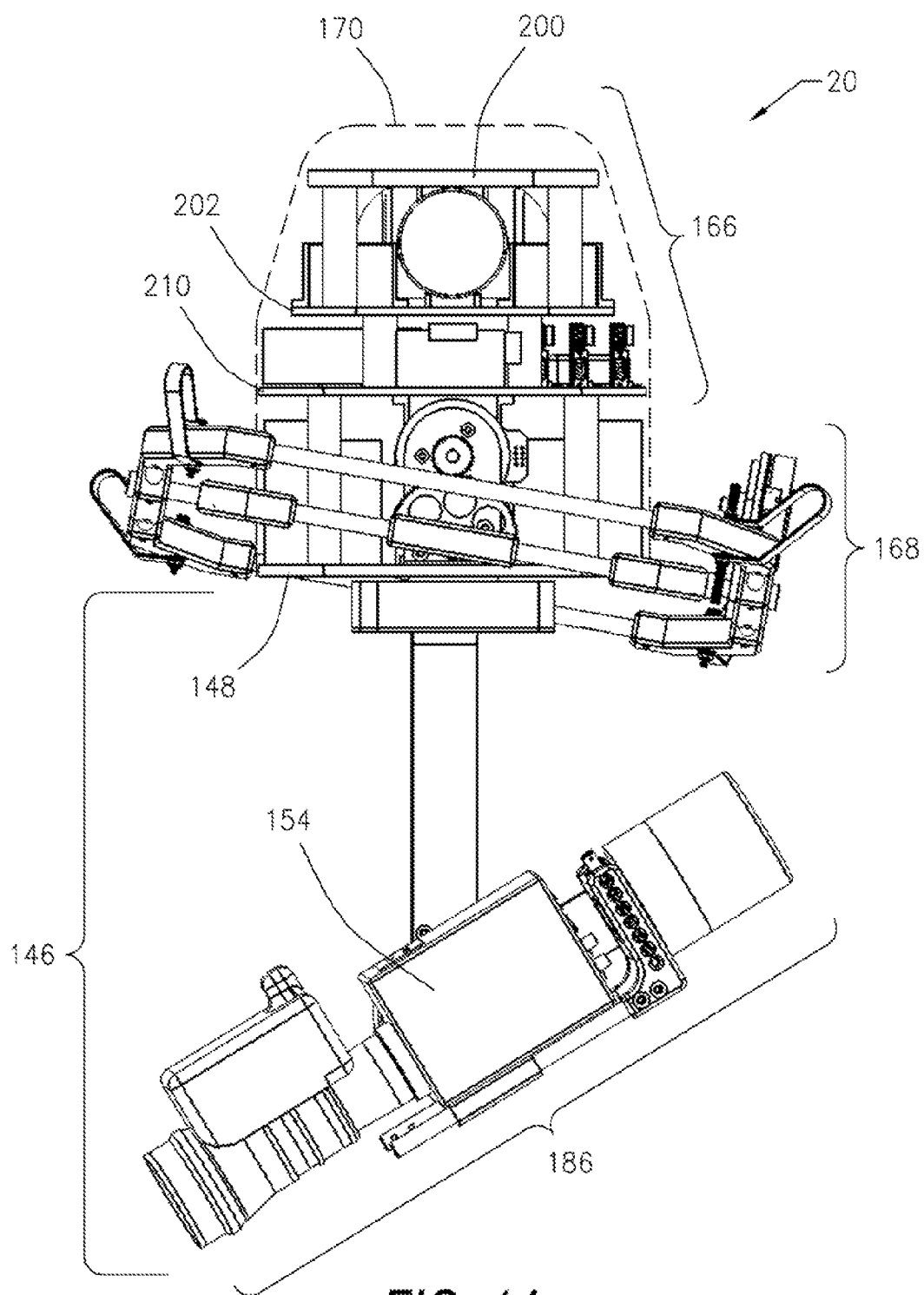
FIG. 14 is a perspective view of another example of a camera head in accordance with an illustrative embodiment of the aerial camera system disclosed herein.
Figure 19:
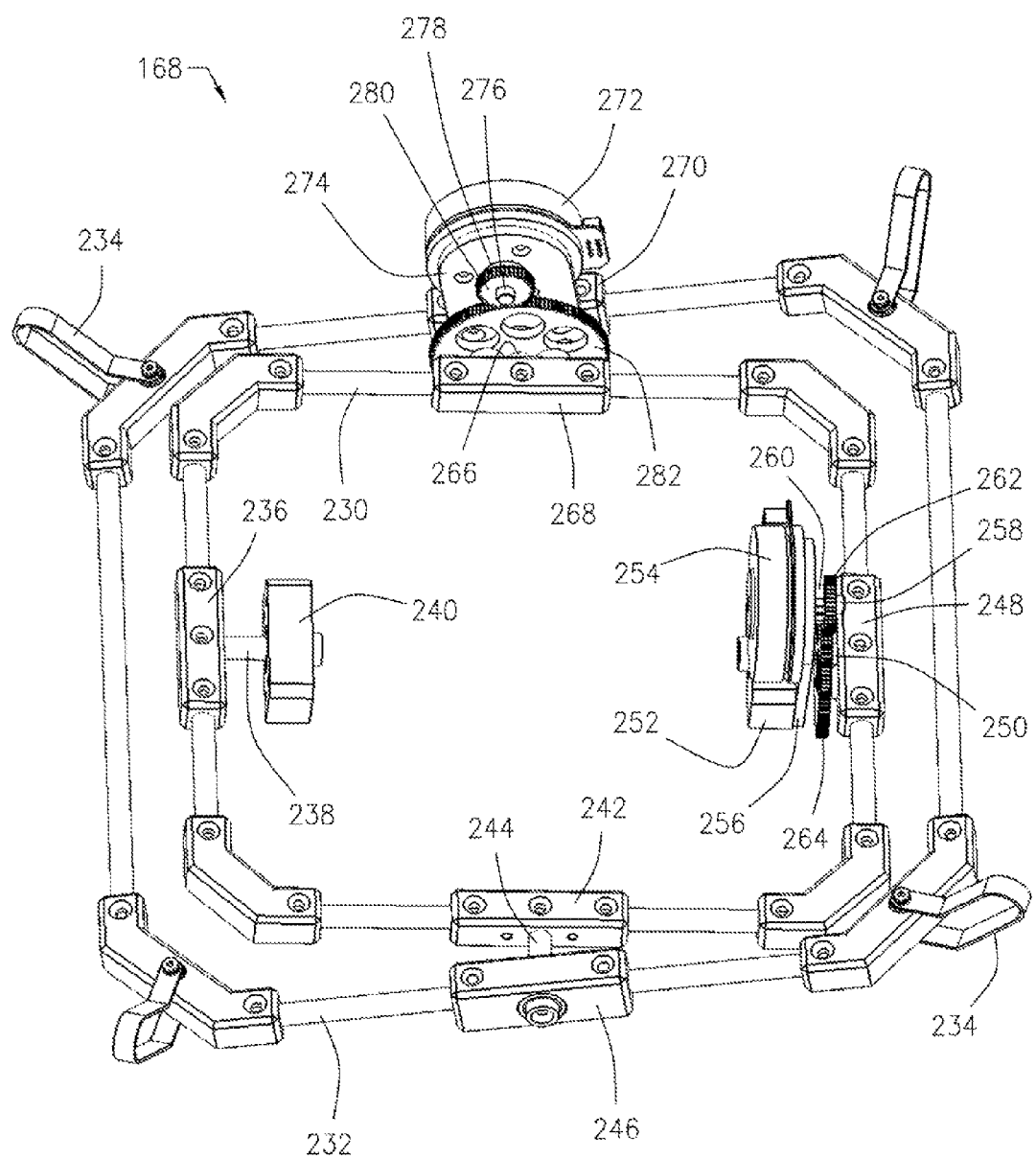
FIG. 19 is a perspective view of an example of a gimbal assembly in accordance with an illustrative embodiment of the aerial camera system disclosed herein.
Figure 20:
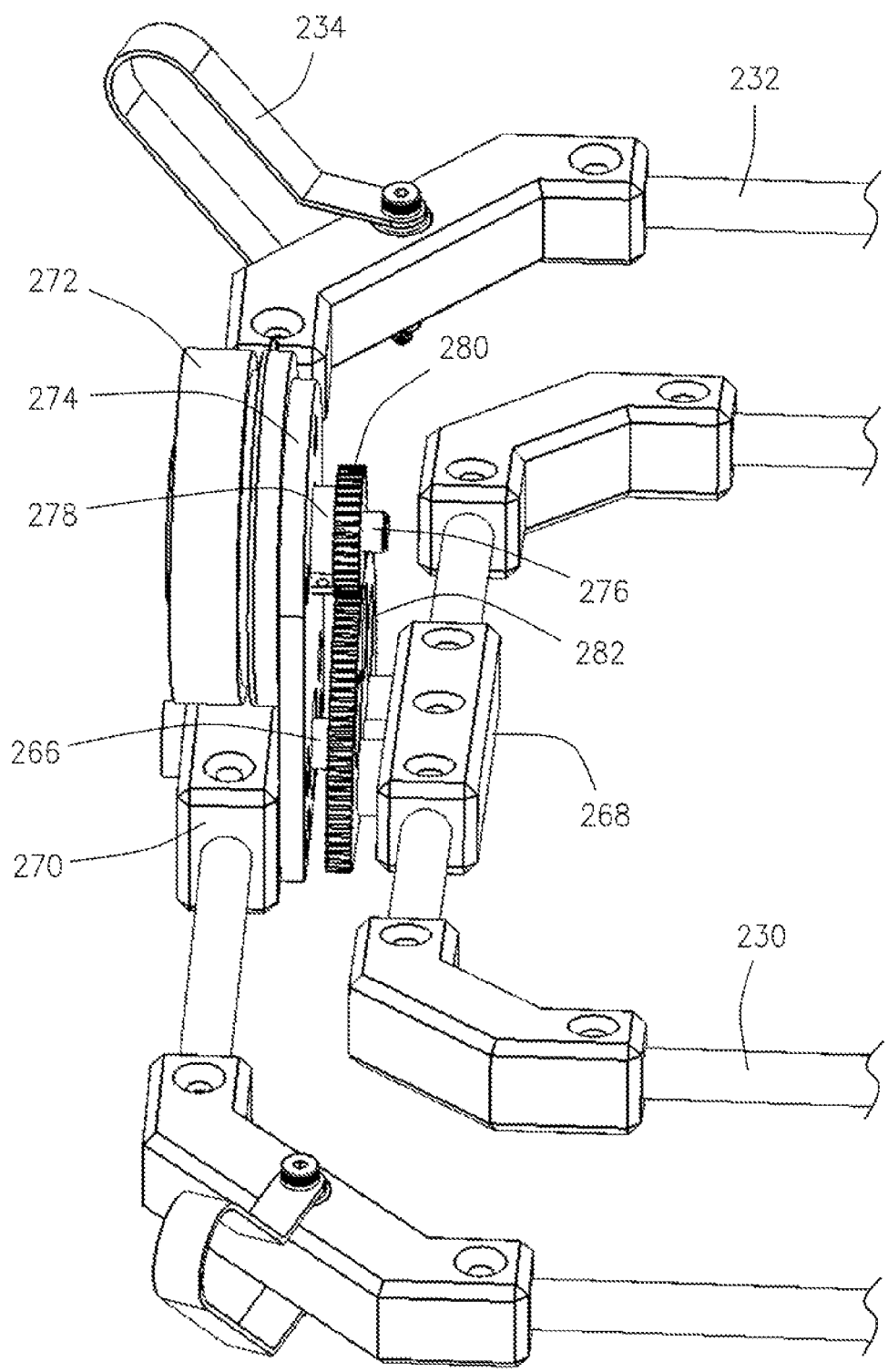
FIG. 20 is an enlarged partial view of an outer leveling motor of the gimbal assembly shown in FIG. 19.

Turning now to FIGS. 19 and 20, the camera head 20 exemplified in FIG. 14 includes the two-axis, rotating gimbal assembly 168. As shown in FIG. 19, the gimbal assembly 168 includes an inner gimbal frame 230 and an outer gimbal frame 232. The size and the shape of the inner gimbal frame 230 and the outer gimbal frame 232 may be adjustable depending upon the particular circumstances in which the aerial camera system 10 is utilized and depending upon the configuration of the camera head 20. For purposes of exemplification, the inner gimbal frame 230 and the outer gimbal frame 232 are illustrated as having a square configuration, but should not be so limited. The gimbal assembly 168 includes a plurality of cable attachment mechanisms 234 upon which the respective main cables 14 may be attached, such as by way of a carabineer (not shown).

The inner gimbal frame 230 includes a first shaft block 236 having a terminal end of a first inner gimbal shaft 238 rotatably disposed therein. The other terminal end of the first inner gimbal shaft 238 is rotatably disposed within a first inner bearing block 240, which in turn is mounted on the main platform 148 of the camera head 20. The inner gimbal frame 230 includes a second shaft block 242 having a terminal end of a first outer gimbal shaft 244 disposed therein. The other terminal end of the first outer gimbal shaft 244 is rotatably disposed within a first outer bearing block 246. The inner gimbal frame 230 also includes a third shaft block 248 having a terminal end of a second inner gimbal shaft 250 disposed therein. The other terminal end of the second inner gimbal shaft 250 is rotatably disposed within a second inner bearing block 252. The second inner bearing block 252 is mounted on the main platform 148 of the camera head 20 and also includes an inner leveling motor 254 secured thereto via an inner motor mount 256. The inner leveling motor 254 includes a drive shaft 258 disposed within a clamping hub 260 and engaged with a motor sprocket 262. The motor sprocket 262 is engaged with a half moon sprocket 264, which has the second inner gimbal shaft 250 engaged therein. During operation of the aerial camera system 10, rotary action of the drive shaft 258 powered by the inner leveling motor 254 is transferred to the motor sprocket 262, which in turn is transferred to the half moon sprocket 264; rotation of the half moon sprocket 264 causes the second inner gimbal shaft 250 to rotate thereby rotating the second inner bearing block 252, which in turn results in movement about an axis of the main platform 148 of the camera head 20.

FIG. 20 illustrates an enlarged partial perspective view of the outer leveling motor assembly of the gimbal assembly 168 of the aerial camera system 10. The gimbal assembly 168 includes a second outer gimbal shaft 266 rotatably disposed between a fourth shaft block 268 and a second outer bearing block 270. An outer leveling motor 272 is secured to the second outer bearing block 270 using a motor mount 274. The outer leveling motor 272 includes a drive shaft 276, which is centrally disposed within and engaged with a clamping hub 278 and a drive sprocket 280. The second outer gimbal shaft 266 is engaged with a half moon sprocket 282, and the half moon sprocket 282 is in communication with the drive sprocket 280. A set of gear spacers 284 may be disposed intermediate of the half moon sprocket 282 and the fourth shaft block 268 of the inner gimbal frame 230. The outer leveling motor 272 operates in much the same manner as the inner leveling motor 254, but rather results in movement of the main platform 148 of the camera head 20 along a second axis via the first inner gimbal shaft 238 that is rotatably disposed within the first inner bearing block 240.

The camera head 20 uses the rotating gimbal assembly 168 (X and Y rotation) with two computer controlled leveling motors 254 and 272 for keeping the main platform 148 level as the gimbal assembly 168 moves. The leveling motor computer controllers 226 input is a three axis, high speed, high resolution solid state gyroscope 212 that provides X, Y, and Z rotational angle information. However, current leveling motor control algorithms have a finite response rate, which may not be able to fully stabilize the camera head 20 against high rates of disturbances. The spinning mass gyroscopes 204 of the aerial camera system 10 eliminate high rate disturbances from reaching the camera 154, and therefore eliminating the need for the motor controllers 226 to react to these high rate inputs. As illustrated in FIG. 16, the aerial camera system 10 may utilize two (2) spinning mass gyroscopes 204, each of which includes two counter rotating masses that spin at a high rate of speed, and therefore resist movement in two axes, included in the camera head 20. The spinning mass gyroscopes 204 are mounted on the camera head 20 so that the X and Y axis each have one of the two spinning mass gyroscopes' 204 control axis resisting its movement and the Z axis has a combination of the other two spinning mass gyroscopes 204 control axis. The Z axis (the pan axis at the camera lens) therefore has effectively double the control and is subsequently highly resistive to high rate disturbances. This is advantageous since the pan axis is the only camera head axis that is hard coupled to the gimbal assembly 168 and therefore the most susceptible to outside disturbances. By adding the spinning mass gyroscopes 204 to the camera head 20, these disturbances do not translate through the structure to the camera lens and the overall effect is a highly stabilized video image regardless of disturbances while moving the camera head 20 through three dimensional space, even at high rates of speed, accelerations and changes in direction.

Furthermore as discussed herein, the camera head 20 may include the combined use of spinning mass gyroscopes 204, the rotational gimbal assembly 168 with leveling motors 254 and 272 and active camera stabilization. Since the camera head 20 includes motion control of the main platform 148 leveling as well as the camera's 154 pan/tilt/roll position, the addition of the solid state gyroscope 212 on the electronics plate 210 completes a control loop that allows the pan motor 224, the tilt motor 178 and the roll motor 188 to compensate for external disturbances that result in unintentional camera movement. The combination of the control method of the aerial camera system 10 along with an actively stabilized platform 148 and spinning mass gyroscopes 204 results in an extremely stabile camera head 20 that significantly improves the video image stability regardless of camera head 20 movement. Each of these system control components of the aerial camera system 10 has unique benefits to the overall camera stabilization and addresses each of the unique types of outside disturbances; the combination of these is much more effective than even the best implementation of each one separately.

An operator's station may comprise at least one operator control panel, a computer and a video monitor. There may be two operators to control the aerial camera system 10: a pilot and a camera operator, however, a single person may act as both the pilot and camera operator. The pilot uses a control panel that has a joystick for moving the camera in the X direction (left or right) and the Y direction (forward or backward), a rocker pot joystick for moving the camera in the Z direction (up or down), and a sensitivity knob for adjusting the relative speed of the system. The camera operator uses the same control panel as the pilot, except that the joystick is for operating the pan and tilt of the camera, the rocker pot joystick operates the zoom and the sensitivity knob operates the focus. The control panel may include LED's showing system status, a guarded toggle switch for controlling the system on/off and an emergency off button. Also included on the control panel may be the interface hardware for the production audio system, including a two channel audio controller with push to talk (on the top of the joystick) and separate volume controls.

A portable computer system can be used to interface the control panel to the main control system (trailer) and to act as an interface to the main computer system 22. Both the portable computer and the video monitor, along with cable connections may be enclosed in a rugged case, called the operators station unit that allows for easy setup of the operator's station. The control panel may plug into the operator station unit using one cable, and the operator's station unit may interface to the main control system (trailer) using a single control cable, which includes multiple fiber optic and copper wires. Keeping the connections limited and simple helps ensure that the aerial camera system 10 can be easily setup in almost any location.

The main control system may comprise the main computer system 22, power supplies, video switching equipment, audio switching equipment and all other interface and control equipment needed to operate the aerial camera system 10. The components of the main control system may be installed within a standard twenty (20) foot enclosed trailer, which allows for easy transport between events and quick and easy setup at each event. The main control system trailer may be the central control system, and the operator's station and the main reels 12 and the safety reel 16 can all be cabled directly to this trailer.

The trailer is typically located outside the stadium near the other video production trucks/trailers. A production interface box, with all the necessary connections for production audio, video and data may be located right at the video production truck and provides easy connection for the video broadcast company. This production interface box (part of the main control system) can then cabled to the main control system trailer using a single, multi-conductor/fiber cable. All audio, video and control/data connections are available at this production interface box. The trailer can also include storage space for the main reels 12, the safety reel 16, the camera head 20 and the operator's station, as well as space for spare parts and tools. The aerial camera system 10 can be packed and transported between events using this trailer.

Setting up a cable suspended camera system's proper flight boundaries is typically a time consuming process for anything other than a very simple rectangular boundary box.

Current methods of allowing a flight boundary area to be created from several boundary condition components, such as boxes, planes, cones and cylinders, results in very complicated boundary structures that require significant computer resources to solve in real-time. Typical systems require limits on the number of boundary conditional components or simply limiting the flight boundary to a simple rectangle in order to keep the computational requirements within the systems capabilities. Unfortunately, using simple rectangles significantly reduces the overall flight space for a particular venue and therefore reduces the overall effectiveness of the camera system itself. The aerial camera system 10 may use a set of predefined initial boundary shapes that not only supports various, typical, flight boundary requirements but also require much less computational resources than building these shapes using separate conditional components. These predefined shapes include rectangles, rectangles with angled sides, and specialized shapes that support unique flight areas but that have computational traits, such as symmetrical or orthogonal sides or planes, that reduce the overall computational resources. By using these predefined boundaries, and simply adjusting their size and location in three dimensional space, the aerial camera system 10 can be quickly setup and still provide a unique flight area that covers more overall area and therefore increases the systems usability and effectiveness.

The aerial camera system 10 may also utilize a Linear Time Collision Detection algorithm, which allows the system to quickly calculate a "safe flight" boundary area of any closed space type (i.e. not limited to simple rectangular spaces). The bounding problem for the camera platform has two components, the setup of the bounding space and the detection of collision with the bounding space. There are several requirements for the algorithm to work. The first requirement is high speed. The system must perform the collision detection hundreds of times per second. The second requirement is that it must work for a general space. This Linear Time Collision Detection algorithm solves both problems.

The Linear Time Collision Detection algorithm is linear time in the collision detection code, which is achieved by calculating the nearest vertex of the space to the camera position and finding the bounding lines created by that vertex and its nearest neighbor on the X, Y, and Z axis. This will create a linear program with three constraints. As long as the new camera position doesn't violate any constraint, the camera is in a valid position. The algorithm requires only three constraints because the closest vertex is known. Constraints that deal with other vertices don't come into play, because if they did, the camera would be closest to that vertex. The most intensive calculation in this is finding the closest vertex which is at the maximum, limited to the total number of vertices for the space.

The algorithm can also handle arbitrary spaces. The only input into the system is a list of extreme points for a three-dimensional space and relationships between the points are created forming the shell of the space. Starting with a single node, the nearest neighbors on the X, Y, and Z axis are determined by calculating the distance on a single axis between the two points and then adding the distance on the other axis cubed. This allows the system to detect points that are close to being on the same axis as a point but creates a slanting type of line. Then the system repeats that process for the newly discovered closest neighbors until the shape is closed.

The solution is implemented with a frontend and a backend architecture. The frontend allows the user to input a series of points using a convenient graphic interface. Once the bounding points have been selected, they are transferred to a backend computer running a real-time operating system. The points are linked to their nearest neighbors during a startup sequence. When the obstacle avoidance system is activated, each new position is submitted to the algorithm which indicates whether the position is inside or outside of the defined area. Using this information, the new position can then be modified so that the camera remains within the defined area. The algorithm can also determine a position's distance from the edge of the defined area. By monitoring this information, the speed of individual motion axis can be modulated so that the camera maintains smooth and continuous motion even as it approaches the edge of the defined area. This behavior could be used by an operator to skim along an interior surface of the defined fly area.

Whereas, the devices and methods have been described in relation to the drawings and claims, it should be understood that other and further modifications, apart from those shown or suggested herein, may be made within the spirit and scope of this invention.

What is claimed is:

1. An aerial camera system, comprising:
    a camera head;
    a plurality of main reels for feeding and reeling a plurality of main cables to support the camera head;
    a camera interface/safety reel for feeding and reeling a safety reel cable, said safety reel cable being used to actively lift said camera head in response to the system being placed in an emergency mode; and
    a main computer system for controlling said feeding and reeling of said main cables and said safety reel cable, wherein the main computer places the system in the emergency mode if an emergency with the system occurs.

2. The aerial camera system of claim 1 wherein said safety reel cable is maintained at a substantially constant tension.

3. The aerial camera system of claim 1 wherein said safety reel cable provides power, data, and video communication between said camera head and said main computer.

4. The aerial camera system of claim 3 wherein said camera interface/safety reel includes a slip ring assembly to effectively transfer said power, data, and video communication between said camera head and said main computer system.

5. The aerial camera system of claim 1 wherein said camera interface/safety reel includes angled sheaves to eliminate cable twist.

6. The aerial camera system of claim 1 further comprising a level wind assembly to keep said safety reel cable wound on a drum of the said interface/safety reel in a controlled and consistent manner.

7. The aerial camera system of claim 6 wherein said level wind assembly includes a solid state tension sensor that accurately measures tension of said safety reel cable regardless of the angle from which said safety reel cable enters or exist said level wind assembly.

8. The aerial camera system of claim 1 wherein each of said main reels and said camera interface/safety reel comprises:
    a portable frame supported on a plurality of casters;
    a motor secured to said frame, said motor having a drive shaft coupled to a drive sprocket, a drive belt coupled to said drive sprocket and a main sprocket; and
    a drum having a central axle, said central axle coupled to said main sprocket, and said central axle coupled to a brake.

9. An aerial camera system, comprising:

a camera head;

a plurality of main reels for feeding and reeling a plurality of main cables to support the camera head;

a camera interface/safety reel for feeding and reeling a safety reel cable, said safety reel cable lifting said camera head when the system is switched to an emergency mode; and a main computer system for controlling said feeding and reeling of said main cables and said safety reel cable, wherein each of said main reels, said camera interface/safety reel and said camera head are in communication with said main computer system, wherein said safety reel cable provides power, data and video communication between said camera head and said main computer system.

10. The aerial camera system of claim 9 wherein said safety reel cable is maintained at a substantially constant tension.

11. The aerial camera system of claim 9 wherein said camera interface/safety reel includes a slip ring assembly to effectively transfer said power, data, and video communication between said camera head and said main computer system.

12. The aerial camera system of claim 9 wherein said camera interface/safety reel includes angled sheaves to eliminate cable twist.

13. The aerial camera system of claim 9 further comprising a level wind assembly to keep said safety reel cable wound on a drum of the said interface/safety reel in a controlled and consistent manner.

14. The aerial camera system of claim 13 wherein said level wind assembly includes a solid state tension sensor that accurately measures tension of said safety reel cable regardless of the angle from which said safety reel cable enters or exist said level wind assembly.

15. The aerial camera system of claim 9 wherein each of said main reels and said camera interface/safety reel comprises:

a portable frame supported on a plurality of casters;

a motor secured to said frame, said motor having a drive shaft coupled to a drive sprocket, a drive belt coupled to said drive sprocket and a main sprocket; and a drum having a central axle, said central axle coupled to said main sprocket, and said central axle coupled to a brake.

16. An aerial camera system, comprising:

a camera head;

a plurality of main reels for feeding and reeling a plurality of main cables to support the camera head;

a camera interface/safety reel for feeding and reeling a safety reel cable, said safety reel cable lifting said camera head when the system is switched to an emergency mode; and a level wind assembly to keep said safety reel cable wound on a drum of the said interface/safety reel in a controlled and consistent manner, wherein said level wind assembly includes a solid state tension sensor that accurately measures tension of said safety reel cable regardless of the angle from which said safety reel cable enters or exist said level wind assembly.

17. The aerial camera system of claim 16 wherein said safety reel cable is maintained at a substantially constant tension.

18. The aerial camera system of claim 16 further comprising a main computer system for controlling said feeding and reeling of said main cables and said safety reel cable, wherein each of said main reels, said camera interface/safety reel and said camera head are in communication with said main computer system.

19. The aerial camera system of claim 18 wherein said camera interface/safety reel includes a slip ring assembly to effectively transfer said power, data, and video communication between said camera head and said main computer system.

20. The aerial camera system of claim 16 wherein said camera interface/safety reel includes angled sheaves to eliminate cable twist.

21. The aerial camera system of claim 16 wherein each of said main reels and said camera interface/safety reel comprises:

a portable frame supported on a plurality of casters;

a motor secured to said frame, said motor having a drive shaft coupled to a drive sprocket, a drive belt coupled to said drive sprocket and a main sprocket; and a drum having a central axle, said central axle coupled to said main sprocket, and said central axle coupled to a brake.

* * * * *